United States Patent
Watanabe et al.

(10) Patent No.: US 9,712,010 B2
(45) Date of Patent: Jul. 18, 2017

(54) MOTOR HAVING A CAGE WAVE STATOR WINDING

(75) Inventors: Atsushi Watanabe, Toyota (JP); Masayoshi Haga, Nagoya (JP); Shingo Hashimoto, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 995 days.

(21) Appl. No.: 13/499,269

(22) PCT Filed: Oct. 14, 2010

(86) PCT No.: PCT/JP2010/068075
§ 371 (c)(1),
(2), (4) Date: Mar. 29, 2012

(87) PCT Pub. No.: WO2012/049759
PCT Pub. Date: Apr. 19, 2012

(65) Prior Publication Data
US 2012/0217836 A1    Aug. 30, 2012

(51) Int. Cl.
*H02K 3/12* (2006.01)
*H02K 15/04* (2006.01)

(52) U.S. Cl.
CPC .......... *H02K 3/12* (2013.01); *H02K 15/0478* (2013.01)

(58) Field of Classification Search
CPC ....................................................... H02K 3/12
USPC ................................................. 310/207, 208
See application file for complete search history.

(56) References Cited

U.S. PATENT DOCUMENTS

| | | | |
|---|---|---|---|
| 2010/0102681 A1* | 4/2010 | Koga et al. | ................. 310/68 B |
| 2010/0289374 A1 | 11/2010 | Koga et al. | |
| 2012/0112595 A1 | 5/2012 | Watanabe et al. | |

FOREIGN PATENT DOCUMENTS

| | | |
|---|---|---|
| EP | 2237391 A1 | 10/2010 |
| JP | 3823555 B2 | 9/2006 |
| JP | 2008-167567 A | 7/2008 |
| JP | 2009-194996 A | 8/2009 |

(Continued)

OTHER PUBLICATIONS

International Search Report of PCT/JP2010/068075 mailed Dec. 7, 2010 and Written Opinion.

(Continued)

*Primary Examiner* — Terrance Kenerly
(74) *Attorney, Agent, or Firm* — Andrews Kurth Kenyon LLP

(57) ABSTRACT

To provide a motor in which a cage coil formed of a wave winding conductor wire wound in plural turns and with bent portions is inserted in an integral type stator core. The motor including a stator provided with a wave winding coil using a flat conductor and a stator core, and a rotor provided with a rotor shaft is configured such that the wave winding coil includes the cage coil formed of a first wave winding wire assembly wound in plural turns, this assembly being formed of a plurality of bent-end wave winding conductor wires formed in a meandering pattern and overlapped in sequence with displacements from each other, a coil end part of the cage coil at one end is bent toward the rotor with respect to in-slot portions of the stator core, and the coil end part at the one end is positioned closer to an axis of the rotor than an inner peripheral surface of the stator core is.

3 Claims, 28 Drawing Sheets

(56) References Cited

FOREIGN PATENT DOCUMENTS

| | | |
|---|---|---|
| JP | 2009-261188 A | 11/2009 |
| JP | 2009-278708 A | 11/2009 |
| JP | 2010-154658 A | 7/2010 |
| JP | 2010-220317 A | 9/2010 |
| WO | 92/01327 A1 | 1/1992 |
| WO | 2010/007950 A1 | 1/2010 |
| WO | 2010073893 A2 | 7/2010 |
| WO | 2010/103872 A1 | 9/2010 |

OTHER PUBLICATIONS

International Preliminary Report on Patentability mailed Jun. 29, 2011.

* cited by examiner

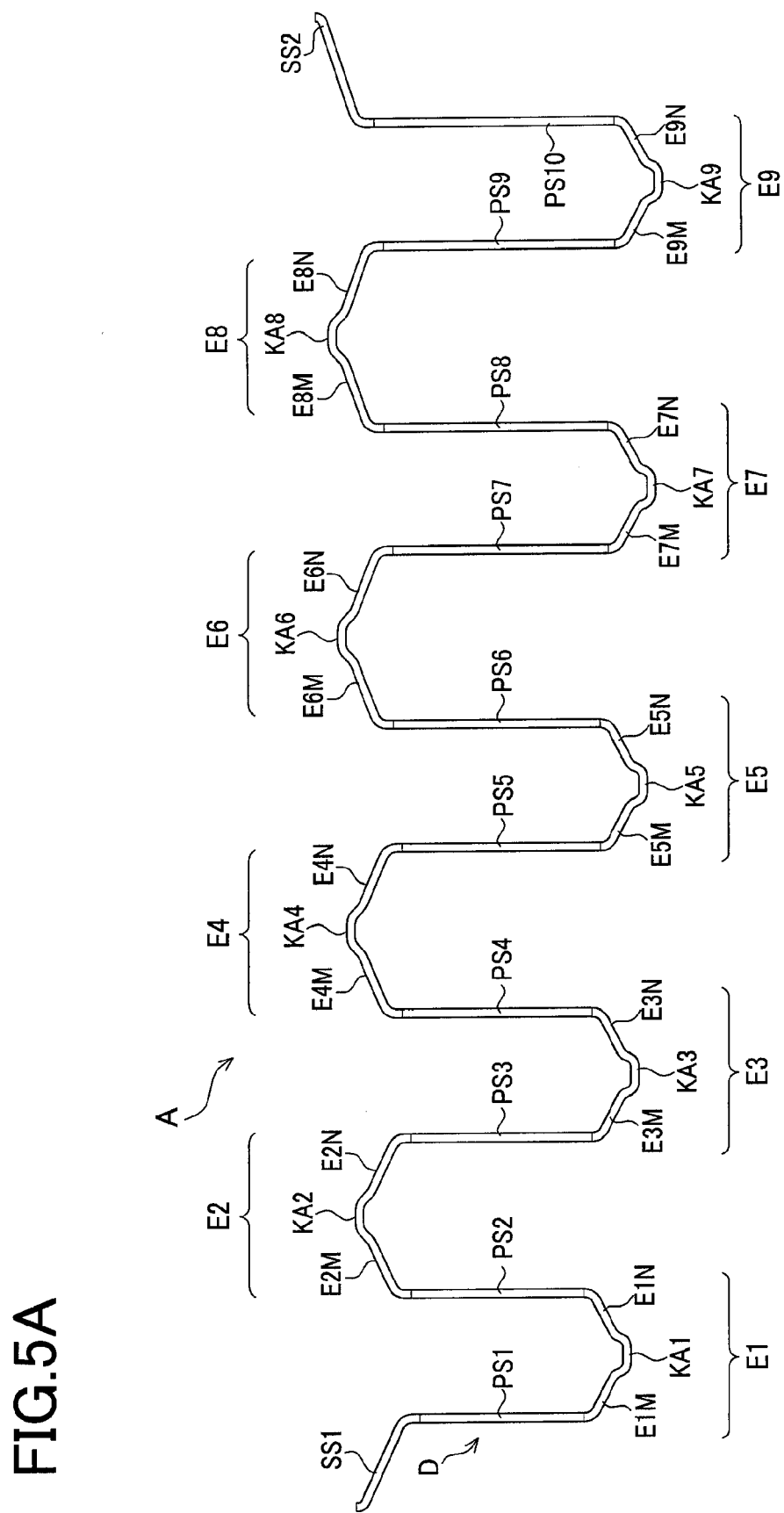

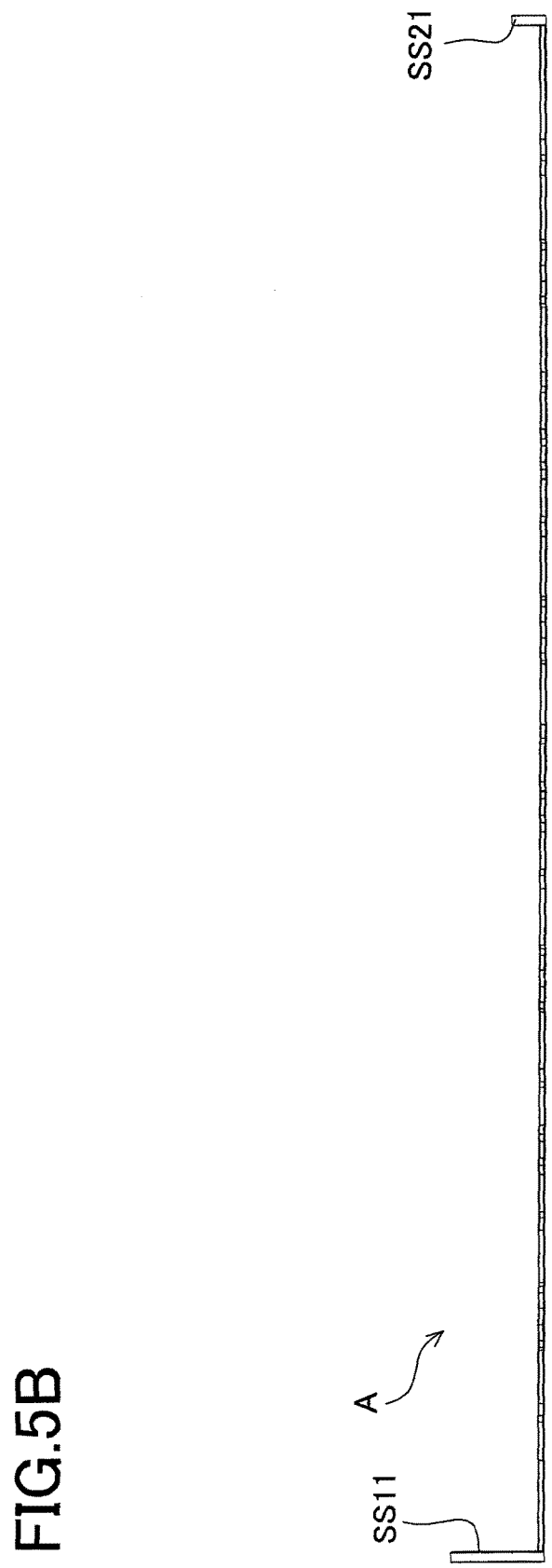

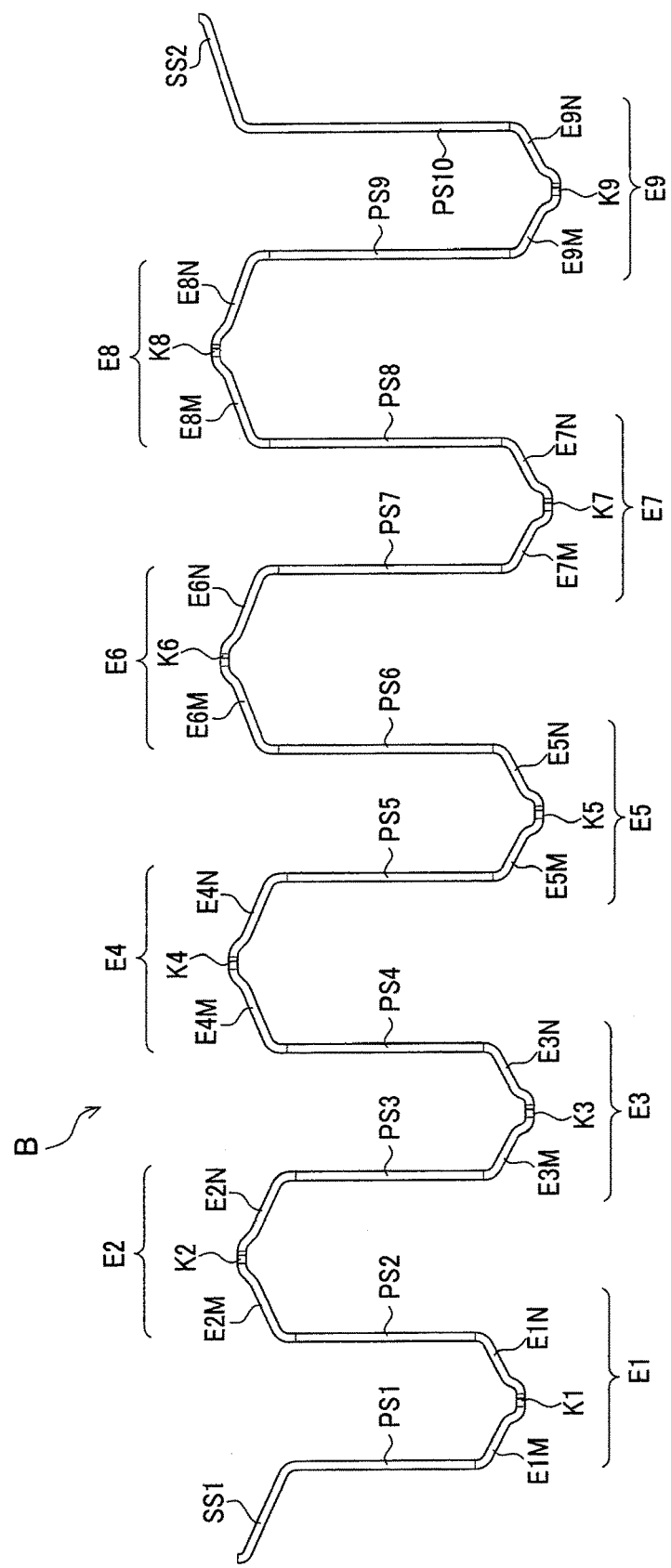

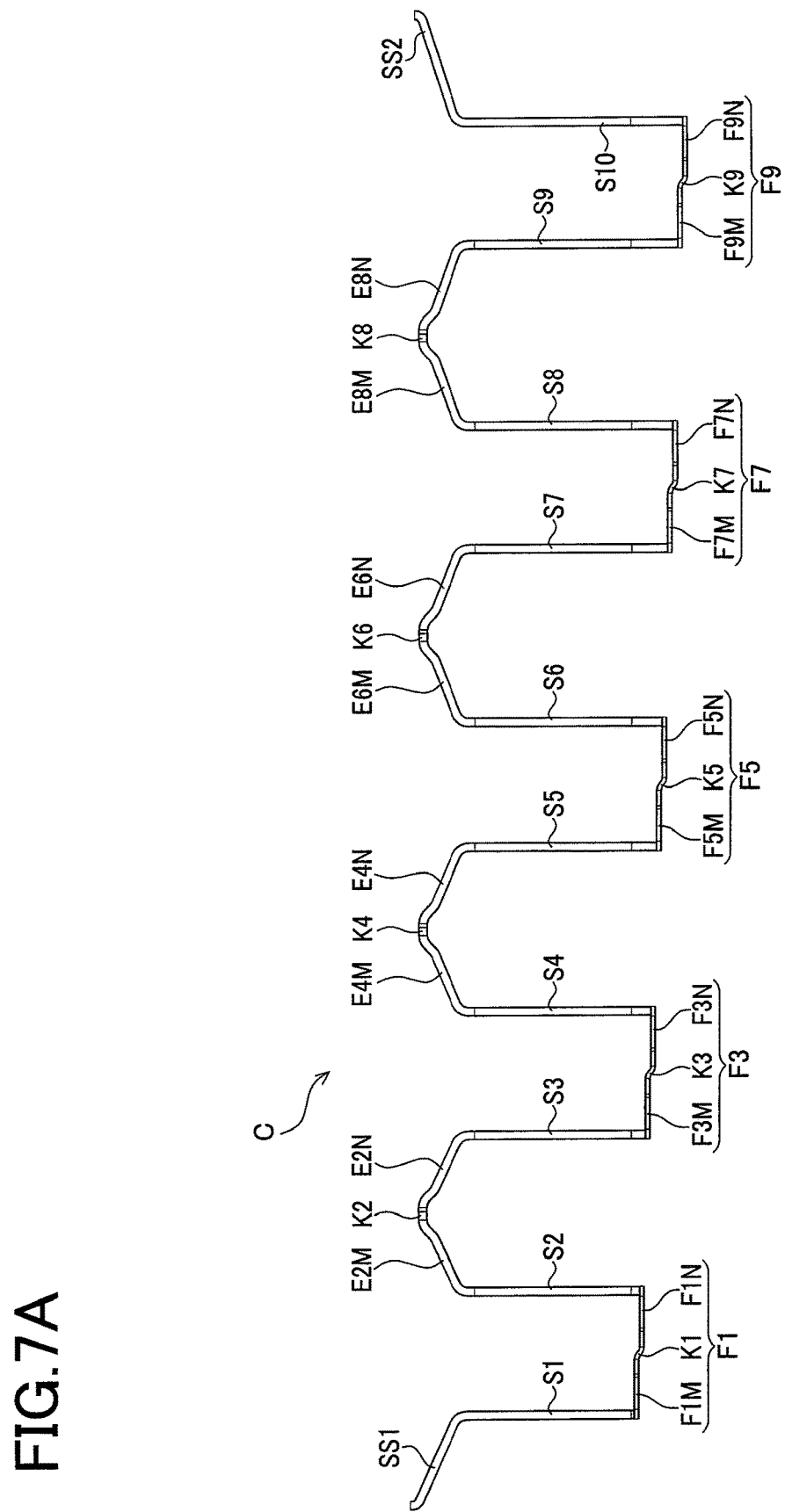

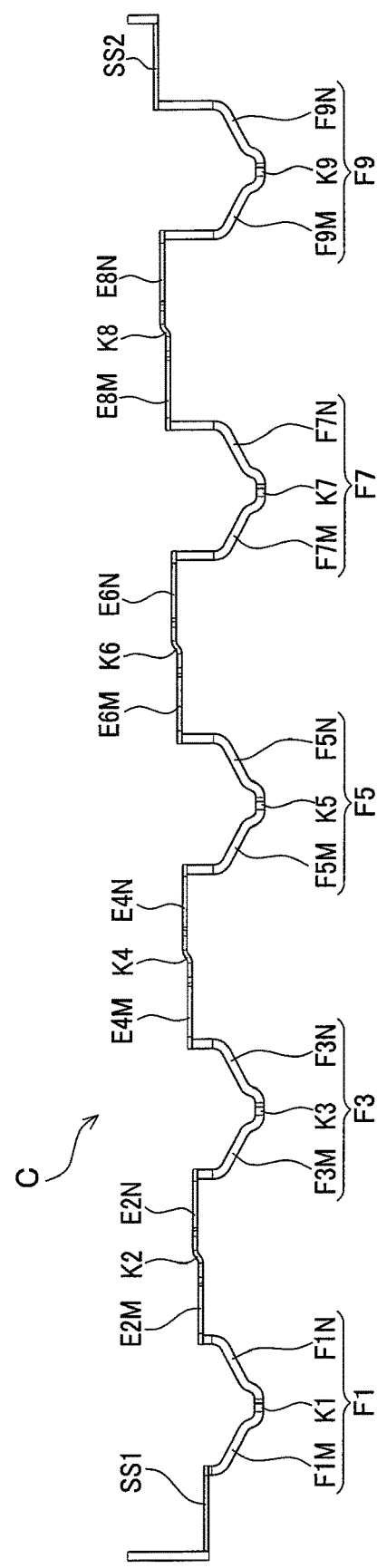

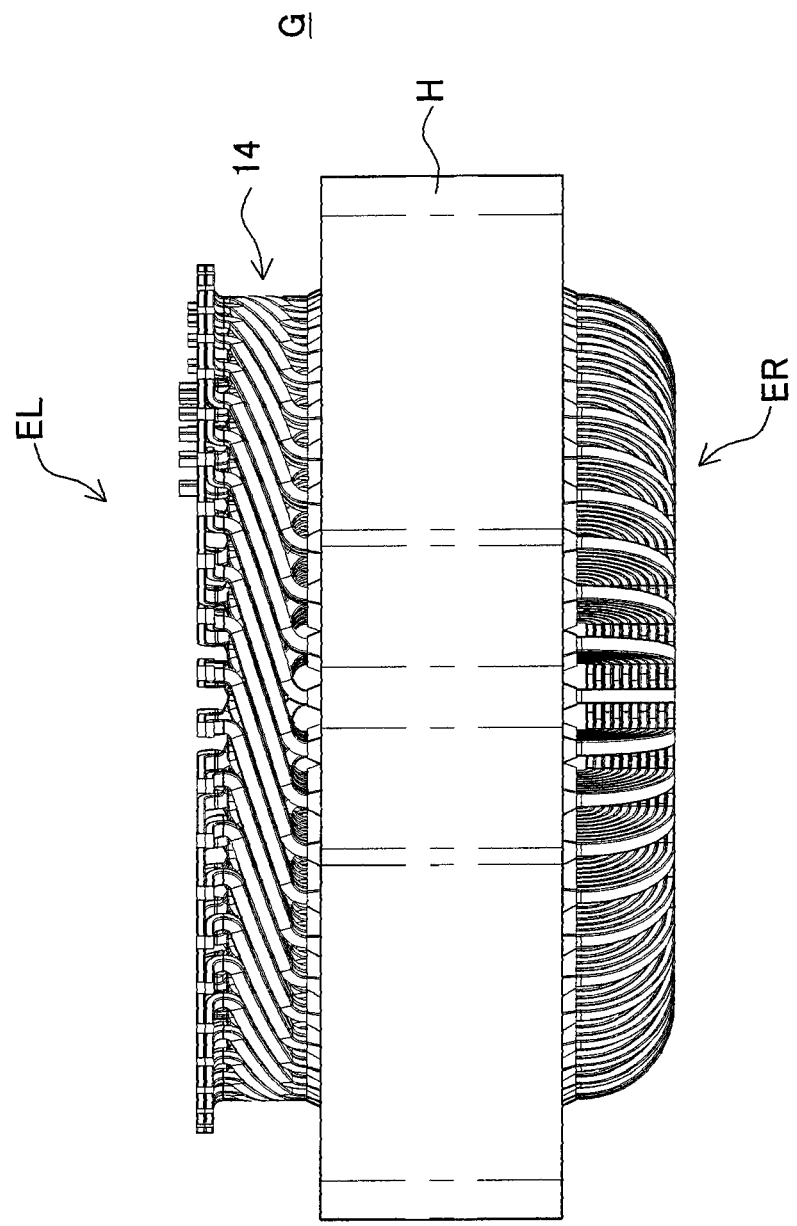

MOTOR HAVING A CAGE WAVE STATOR WINDING

CROSS-REFERENCE TO RELATED APPLICATIONS

This is a 371 national phase application of PCT/JP2010/068075 filed on 14 Oct. 2010, the entire contents of which are incorporated herein by reference.

TECHNICAL FIELD

The present invention relates to a motor including a stator provided with a wave winding coil using a flat conductor wire and a stator core, and a rotor provided with a center shaft.

BACKGROUND ART

Patent Document 1 discloses the following technique. Specifically, two sets of combined conductors each including flat conductor wires each of which is continuously formed in a meandering (rectangular waves) pattern and which overlap one on the other with displacement are assembled in overlapping relation to form an overlapped conductor assembly. This assembly is wound in multiple turns to form a cage-shaped coil ("cage coil"). In this cage coil, core pieces of a split core divided from the outer periphery to the inner periphery are inserted. A shrink fit ring is fitted around the outer periphery of the split core to fasten the core as a stator core.

Patent Document 2, on the other hand, discloses a method of inserting a coil in slots of a stator core in such a manner that a conductor wire is wound to form a coil to be inserted in the slots, the coil is set on a cylindrical coil insertion jig, which is then placed inside the stator core, and the coil is inserted from the insertion jig into the slots.

Patent Document 3 discloses that a distributed winding coil with its leading end to be inserted is bent toward an axis.

RELATED ART DOCUMENTS

Patent Documents

Patent Document 1: JP 2010-154658A
Patent Document 2: JP 2008-167567A
Patent Document 3: WO 92/01327

DISCLOSURE OF THE INVENTION

Problems to be Solved by the Invention

However, the technique of Patent Document 1 has the following problems. In the case where an integral stator core is formed of split core pieces fit in the shrink fit ring, this core causes a problem with an increase in iron loss (core loss), decreasing the efficiency of a motor, as compared with an initially integrally formed stator core. This is especially an issue in a motor for hybrid vehicles demanded for size reduction.

In the case of using the coil insertion jig as disclosed in Patent Document 2, the coil is elastically deformed during insertion. Thus, it is assumed that the coil is installed in the stator core while internal stress is accumulated in the conductor wire forming the coil. After the coil elastically deformed in the coil insertion jig is inserted in the slot, the coil may become deformed by spring back, causing a part of the conductor wire to protrude out of the slots.

Therefore, the present applicant conceived that the above problem could be solved by adapting insertion of the coil along an axis direction into the slots in the inserting method of the winding coil in the integral stator core. For this end, a concentrated winding coil is required only to bend a leading end for insertion toward the axis side, so that a remaining part of the coil can be easily inserted in the slots. In contrast, the winding coil has a complicated shape in a portion to be bent and thus bending thereof is difficult.

Patent Document 3 discloses a technique of bending a leading end for insertion of a distributed winding coil. In the technique of Patent Document 3, however, it is necessary to individually produce a plurality of conductors with bent portions in different locations and assemble them one by one. Such production takes long time and results in high costs.

For the wave winding coil, the combined conductor wires are wound in multiple turns to form a cage coil. However, when the combined conductor wires each formed with bent portions are to be wound in plural turns, the bent portions of a conductor wire portion to be wound later is likely to interfere with the bent portions of a conductor wire portion wound earlier. It is therefore difficult to form the bent portions in the wave winding conductor wire.

The present invention has been made to solve the above problems and has a purpose to provide a motor in which a cage coil is inserted in an integral stator core, the cage coil formed with bent portions being formed of wave winding conductor wires having bent portions and being wound in multiple turns.

Means of Solving the Problems

To achieve the above purpose, one aspect of the invention provides a motor configured as below.

(1) A motor includes a stator provided with a wave winding coil using a flat conductor wire and a rotor provided with a center shaft, wherein the wave winding coil includes a cage coil formed of a wave winding wire assembly wound in plural turns, the assembly consisting of a plurality of wave winding conductor wires each being formed in a continuous meandering pattern and overlapped in sequence with displacements, a coil end part of the cage coil at one end is bent toward the rotor side with respect to in-slot portions of the stator core, and the coil end part at the one end is located closer to an axis of the rotor than an inner peripheral surface of the stator core is.

(2) In the motor described in (1), preferably, a turned portion is formed at one end of each of the wave winding conductor wires and a turned portion formed at the other end are overlapped in the axis direction of the stator core in the coil end part of the cage coil at the one end.

Effects of the Invention

The aspect of the present invention having the aforementioned configuration can achieve the following operations and effects.

The aspect of the invention described in (1) mentioned above is the motor including a stator provided with a wave winding coil using a flat conductor wire and a rotor provided with a center shaft, wherein the wave winding coil includes a cage coil formed of a wave winding wire assembly wound in plural turns, the assembly consisting of a plurality of wave winding conductor wires each being formed in a continuous meandering pattern and overlapped in sequence with displacements, a coil end part of the cage coil at one end is bent toward the rotor side with respect to in-slot portions of the stator core, and the coil end part at the one end is located closer to an axis of the rotor than an inner peripheral surface of the stator core is.

Accordingly, when the coil is to be inserted in the slots of the stator along the axis side while the coil end portion on the lead side at the one end is directed as a leading end, the turned portions formed on a non-lead side which becomes the coil end portion at the one end passes more inward than the inner peripheral surface of the stator core.

Therefore, it is possible to easily insert the cage coil in the slots of the stator core along the axis direction without interference of teeth formed in the stator core with the cage coil. Since there is no need to elastically deform the wave winding coil when this coil is inserted in the slots of the stator core, part of the coil is less likely to protrude out of the slots of the stator core due to spring back caused by elastic deformation of the coil as described in the above problems.

(2) In the motor described in (1), a turned portion is formed at one end of each of the wave winding conductor wires and a turned portion formed at the other end are overlapped in the axis direction of the stator core in the coil end part of the cage coil at the one end. Accordingly, end portions of the adjacent wave winding conductor wires in different phases (U phase, V phase, W phase) are located in the same positions in the radial direction. This facilitates connection between the end portions.

BRIEF DESCRIPTION OF THE DRAWINGS

FIG. 5A is a front view of a wave winding conductor wire in the embodiment;

FIG. 5B is a top view of the wave winding conductor wire in the embodiment;

FIG. 6A is a front view of a stepped wave winding conductor wire in the embodiment;

FIG. 7A is a front view of a bent-end wave winding conductor wire in the embodiment;

FIG. 7B is a bottom view of the bent-end wave winding conductor wire in the embodiment;

FIG. 11A is a side view of a stator in the embodiment;

MODE FOR CARRYING OUT THE INVENTION

A detailed description of a preferred embodiment of the present invention will now be given referring to the accompanying drawings.

Figure 1:
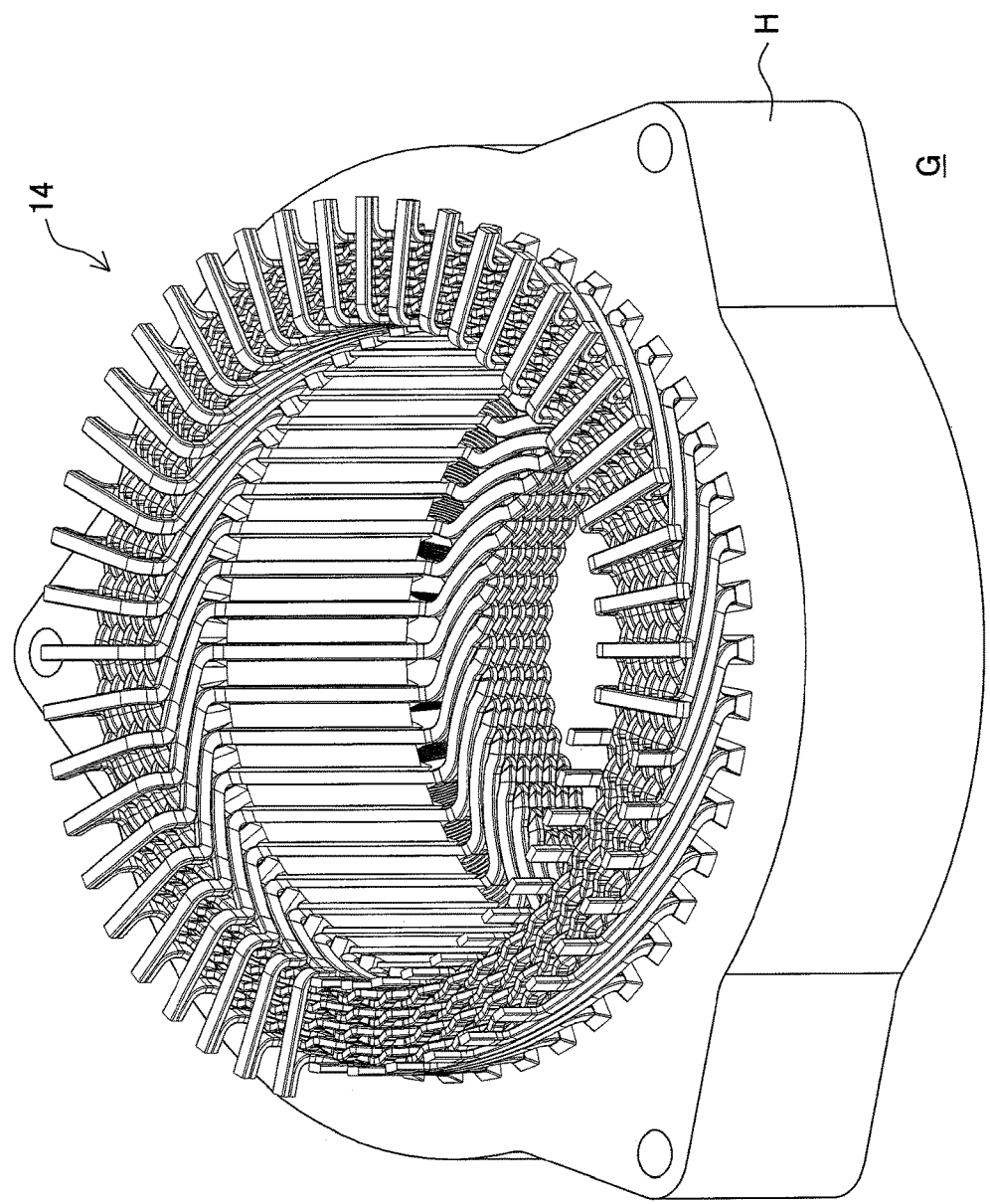
FIG. 1 is a perspective view of a stator in a present embodiment.
Figure 2:
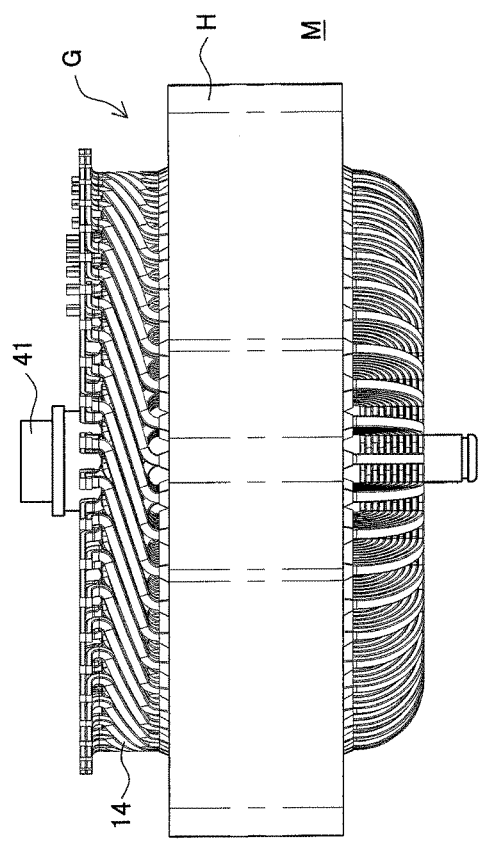
FIG. 2 is a side view of a motor in the embodiment.

FIG. 1 is a perspective view of a stator G in the present embodiment. FIG. 2 is a side view of a motor M. The stator G in the embodiment is a stator including a cage coil 14 formed of a wave winding coil and being mounted in the motor M. In the stator G, a rotor 42 including a rotor shaft 41 mentioned later is provided as a rotator. The stator G includes a stator core H and the cage coil 14.

Figure 3:
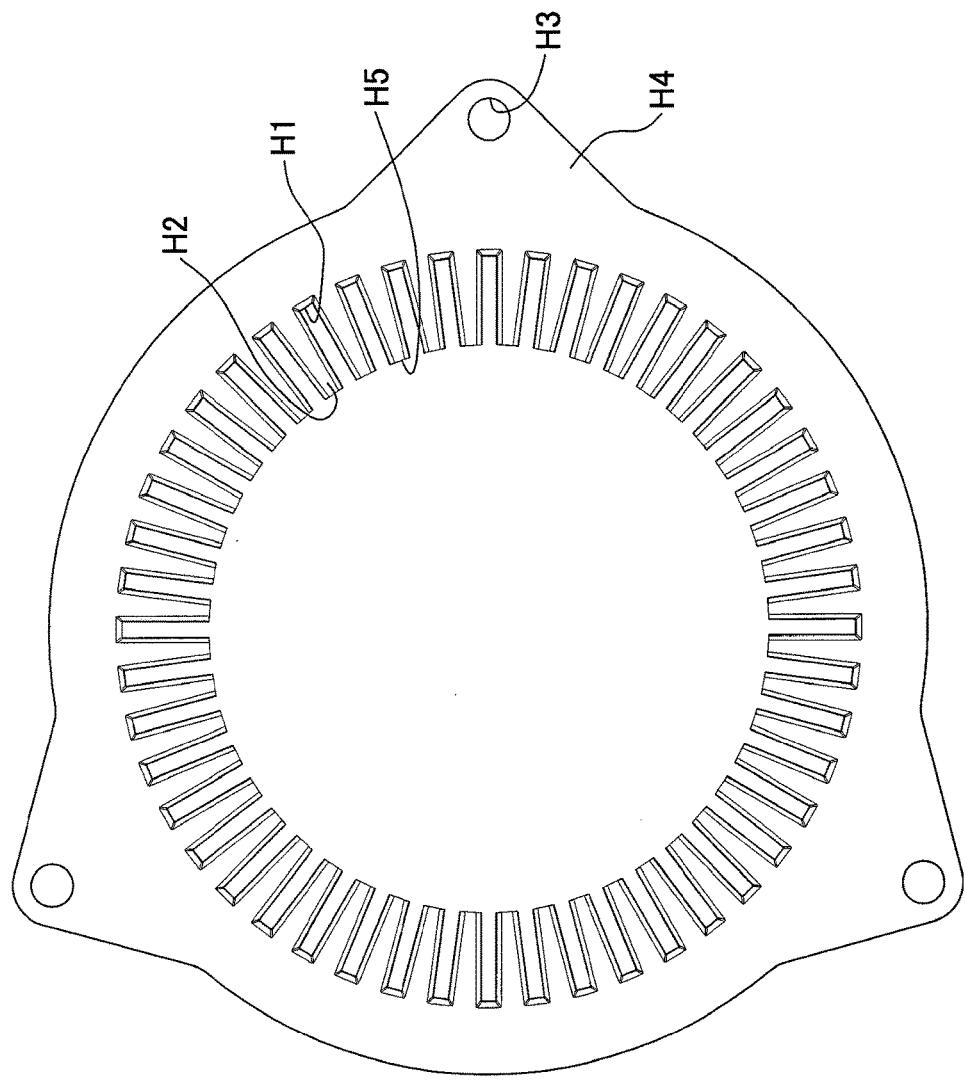
FIG. 3 is a plan view of a stator core in the embodiment.

FIG. 3 is a plan view of the stator core H. This stator core H is formed of a plurality of magnetic steel sheets each having been punched into almost annular form by press work and laminated.

On the inner periphery side of the stator core H, teeth H2 are formed in a comb-like shape, protruding inward toward the axis. Slots H1 are formed between adjacent teeth H2. The number of slots H1 and the number of teeth H2 are 48, respectively. The stator core H is formed, on its outer periphery, with three ribs H4. These ribs H4 are individually formed with bolt holes H3 in each of which a bolt is to be inserted. These bolt holes H3 can be used, for example, to secure the stator G in an engine block not shown, fix the same to another auxiliary unit, or attach the same to a cover of the motor M or the like. At a distal end of each tooth H2, an inner peripheral surface H5 is formed. Even though it is not illustrated, the stator G of the motor M is also provided with an external connection terminal and others.

Figure 4A:
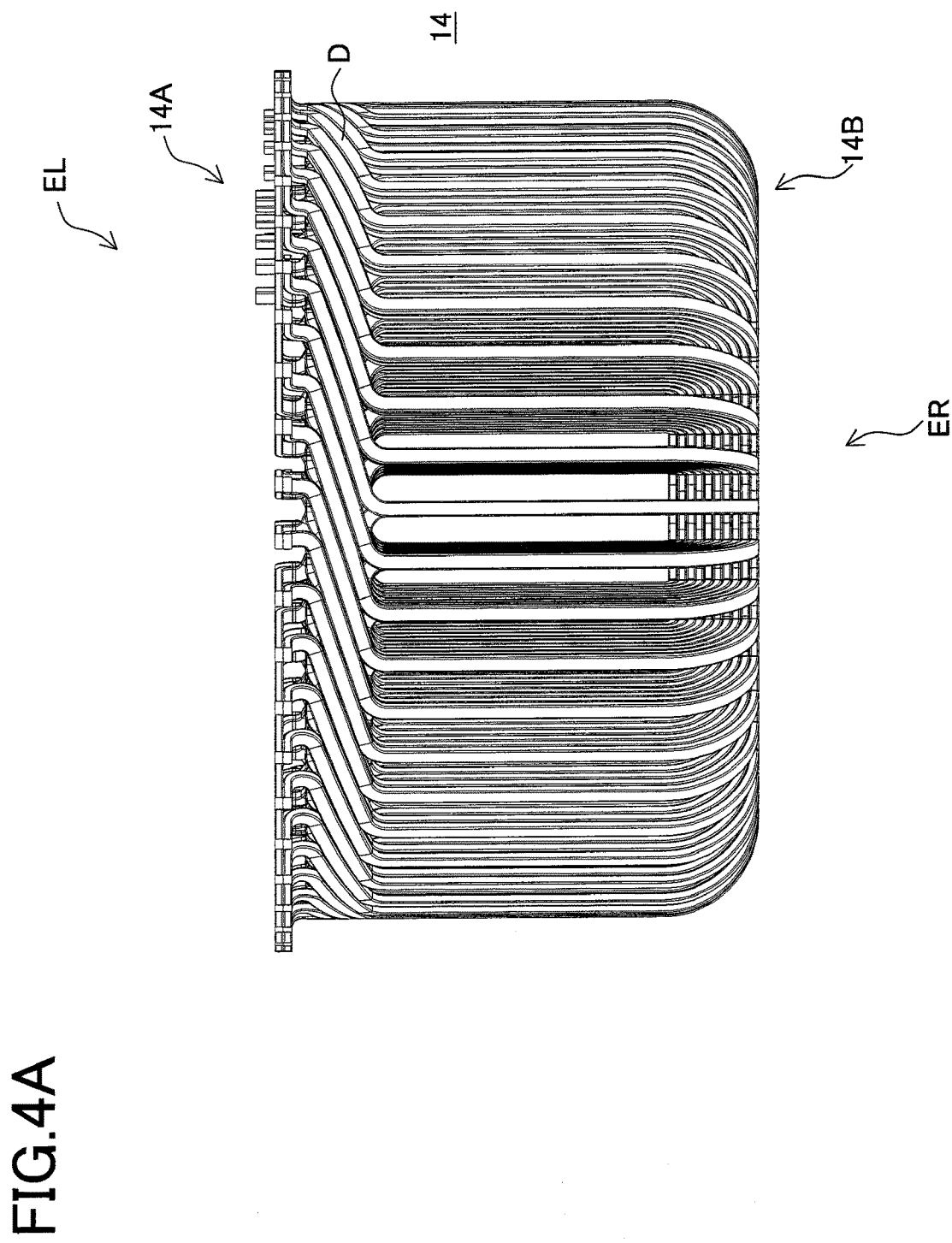
FIG. 4A is a side view of a cage coil in the embodiment.
Figure 4B:
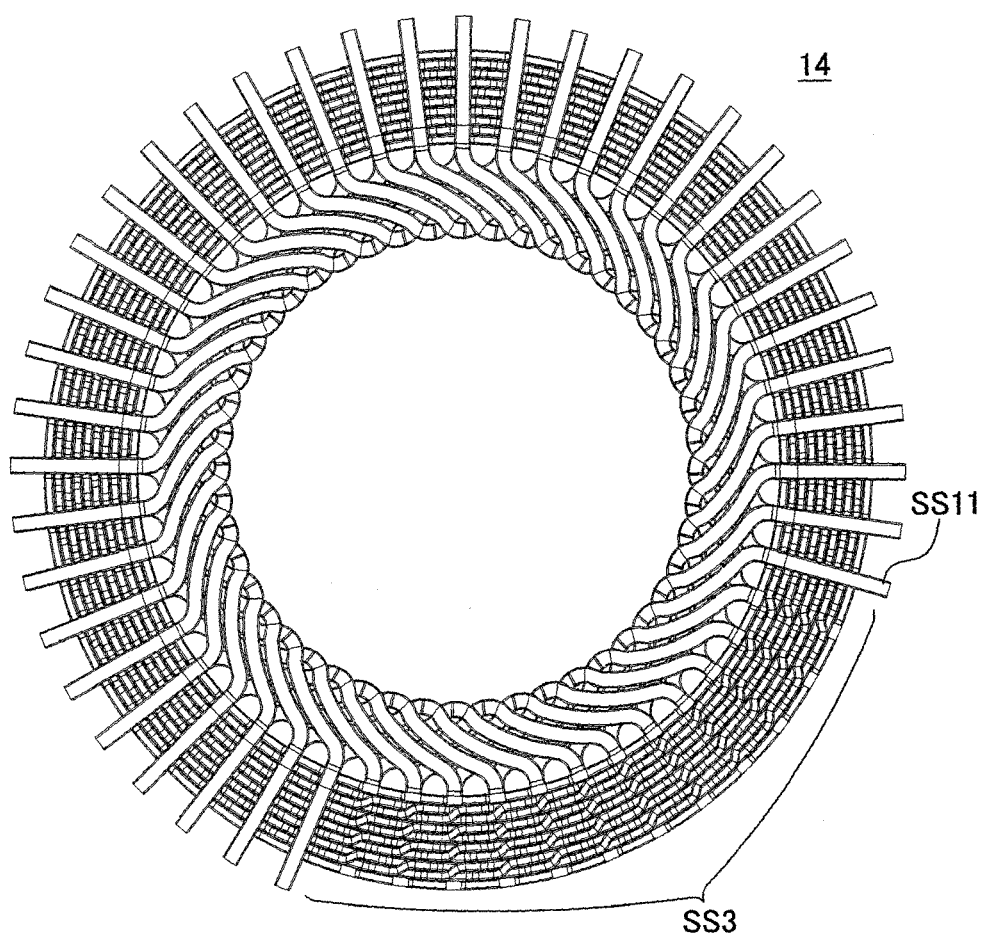
FIG. 4B is a top view of the cage coil in the embodiment.
Figure 4C:
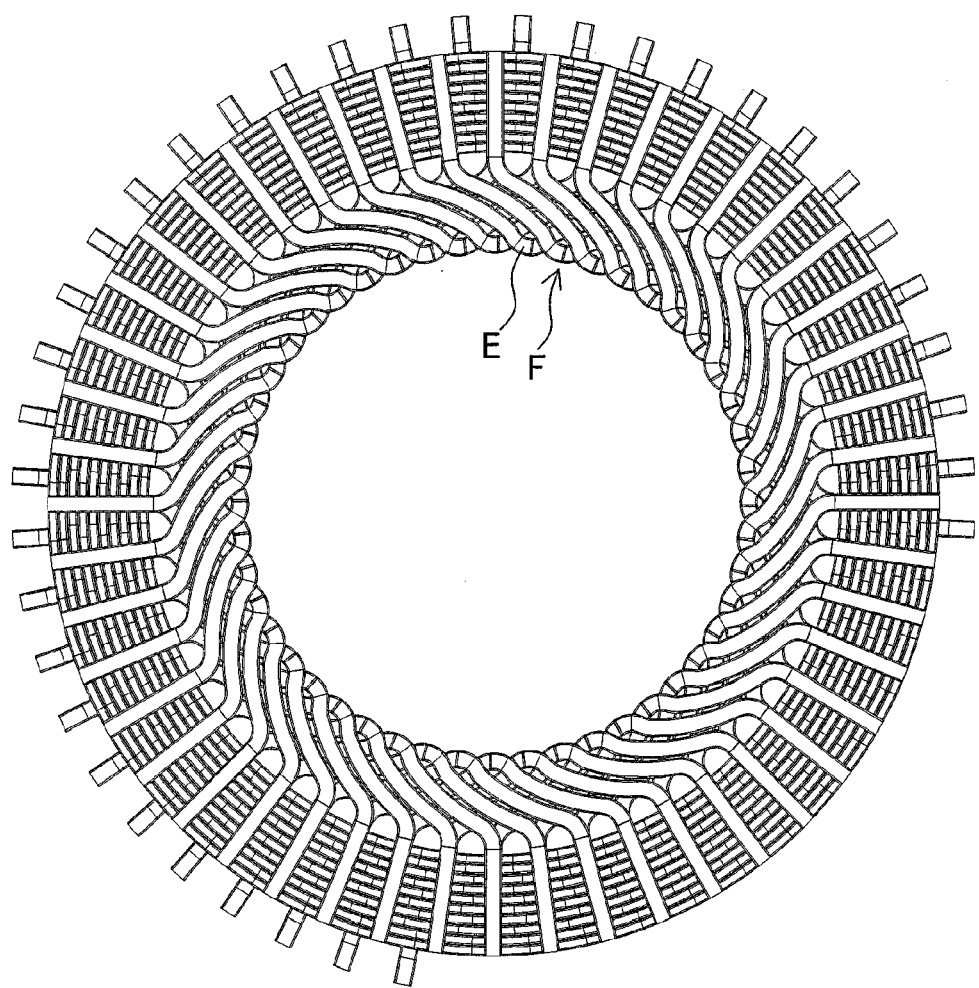
FIG. 4C is a bottom view of the cage coil in the embodiment.

FIG. 4A is a side view of the cage coil 14. FIG. 4B is a plan view of the cage coil 14, which is a plan view of the cage coil 14 of FIG. 4A, seen from a lead side EL. FIG. 4C is a plan view of the cage coil 14, which is a plan view of the cage coil 14 of FIG. 4A, seen from a non-lead side ER.

The cage coil 14 is formed of a plurality of conductor wires overlapped in a cylindrical form. Each conductor wire is formed of a wave-wound flat conductor D. The process of forming the cage coil 14 will be mentioned in detail later. The flat conductor D is made of high conductive metal such as copper, having a rectangular cross section, and coated with an insulating coat such as enamel.

On the lead side EL, end portions of the flat conductors D are located as shown in FIG. 4B. Bent end portions SS11 which are end portions of the flat conductors D are arranged radially to protrude outward of the cage coil 14. Note that a terminal binding section SS3 in which the bent end portions SS11 are absent represents a zone to which bus bars will be welded and which will be connected to external connection terminals not shown of the stator G. The details will be mentioned later.

On the non-lead side ER, the end portions of the flat conductors D are not placed as shown in FIGS. 4A and 4C but only connecting wire portions ("connecting portions") E are placed. Those connecting portions E are bent inward of the cage coil 14 to form inward protruding portions F. The details thereof will be mentioned later.

The process of forming the cage coil 14 will be explained below.

Figure 5C:
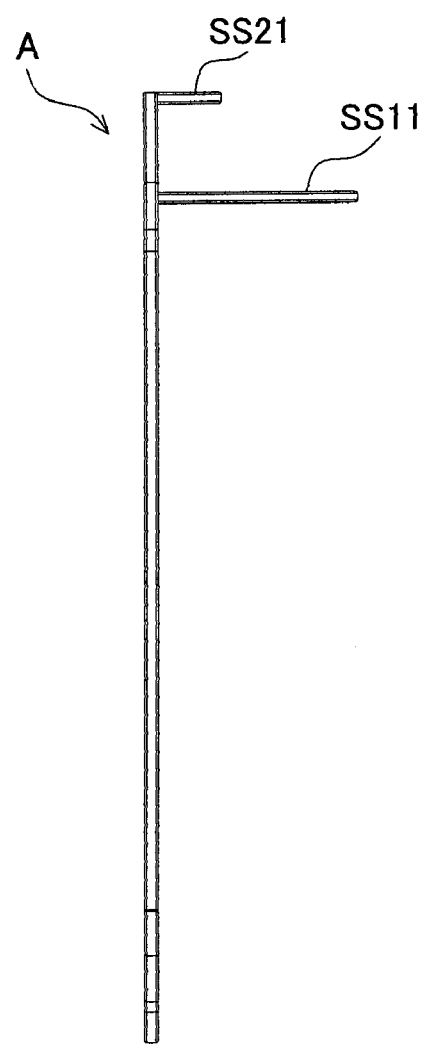
FIG. 5C is a side view of the wave winding conductor wire in the embodiment.

FIG. 5A is a front view of a wave winding conductor wire ("wave winding wire") A. FIG. 5B is a top view of the wave winding wire A, seen from the side of a first conductor end portion SS1 and a second conductor end portion SS2 in FIG. 5A. FIG. 5C is a side view of the wave winding wire A, seen from the side of the second conductor end portion SS2 and a straight wire portion ("straight portion") PS 10 in FIG. 5A. The wave winding wire A is formed by edgewise bending the flat conductor D shown in FIG. 5A and other figures in a meandering pattern. A first conductor end portion SS1 provided at an end is bent in a depth direction perpendicular to the drawing sheet of FIG. 5A to form a bent end portion SS11 as shown in FIGS. 5B and 5C.

Following the first conductor end portion SS1, a straight portion PS1 is formed, which will be inserted in a slot H1 of the stator core H. Following the straight portion PS1, a connecting portion E1 is formed, which will be placed outside the slot H1 to form a circumferential connecting portion. The connecting portions E form turned portions of the flat conductor D arranged in a meandering pattern. Subsequently, adjacent to the connecting portion E1, a straight portion PS2, a connecting portion E2, a straight portion PS3, a connecting portion E3, . . . up to a straight portion PS10 are sequentially formed and then connected to a second end portion SS2. The second conductor end portion SS2 is also formed with a bent end portion SS21 as shown in FIGS. 5B and 5C.

Note that forty-eight sets of the wave winding wires A are formed to be inserted in the stator core H but six sets of them are not formed with the bent end portions SS11 in the first wire end portions SS1 and the bent end portions SS21 in the second wire end portions SS2. Specifically, in the terminal binding section SS3 of the cage coil 14 in FIG. 4B, the first and second end portions SS1 and SS2 are the ends of each flat conductor D edgewise bent in the meandering pattern.

The connecting portion E1 includes a front part E1M and a rear part E1N divided by a step-unformed part KA1. Similarly, the connecting portion E2 includes a front part E2M and a rear part E2N divided by a step-unformed part KA2. The same configuration applies to the other connecting portions E3 to E9. The step-unformed part KA1, the step-unformed part KA2, . . . are parts of the wave winding wire A not formed yet with steps.

Further, the straight portions PS1 to PS10 are subjected to edgewise processing to be gradually longer so that the straight portion PS2 is longer than the straight portion PS1, the straight portion PS3 is longer than the straight portion PS2, . . . , that is, the straight portion PS10 is longest, even though such a condition is not clearly illustrated in FIG. 5A.

Figure 6B:
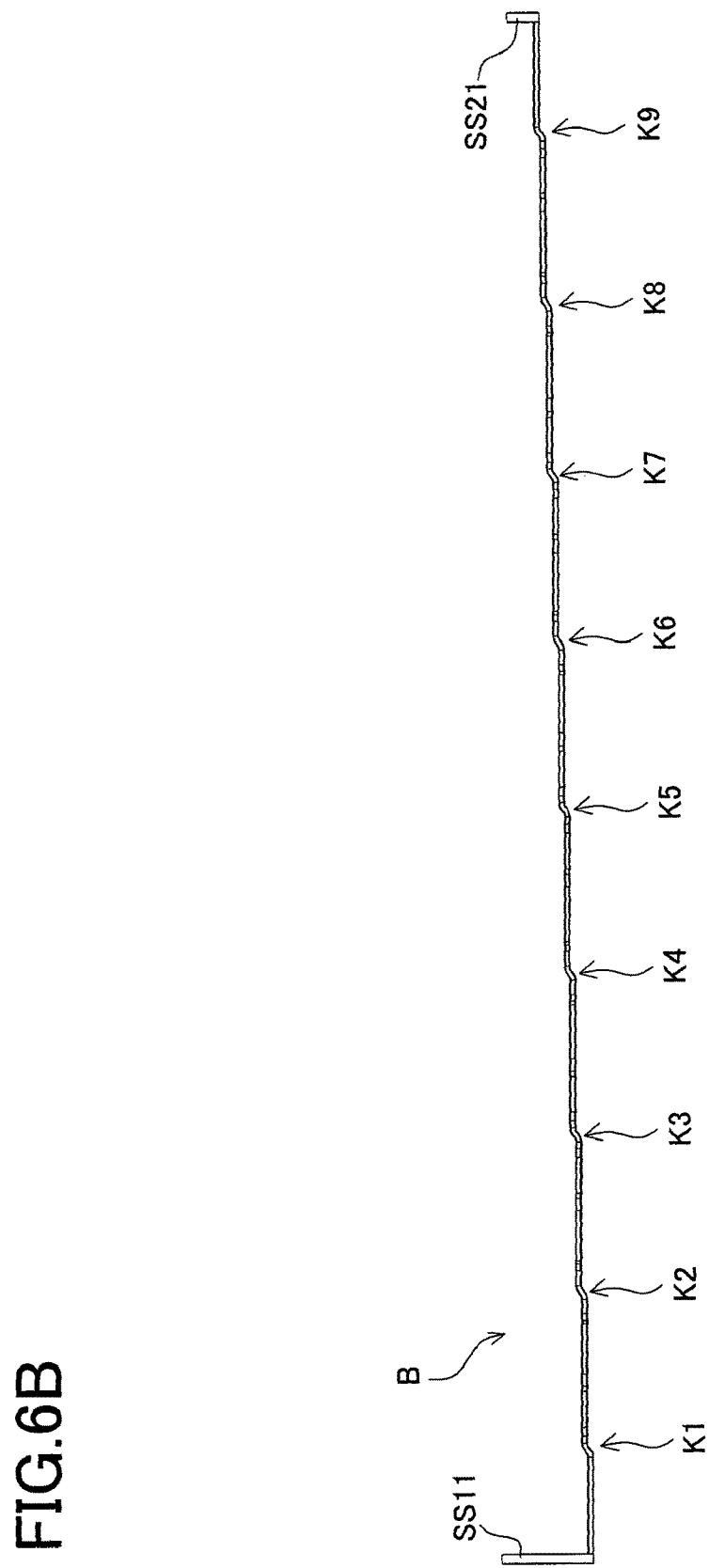
FIG. 6B is a top view of the stepped wave winding conductor wire in the embodiment.
Figure 6C:
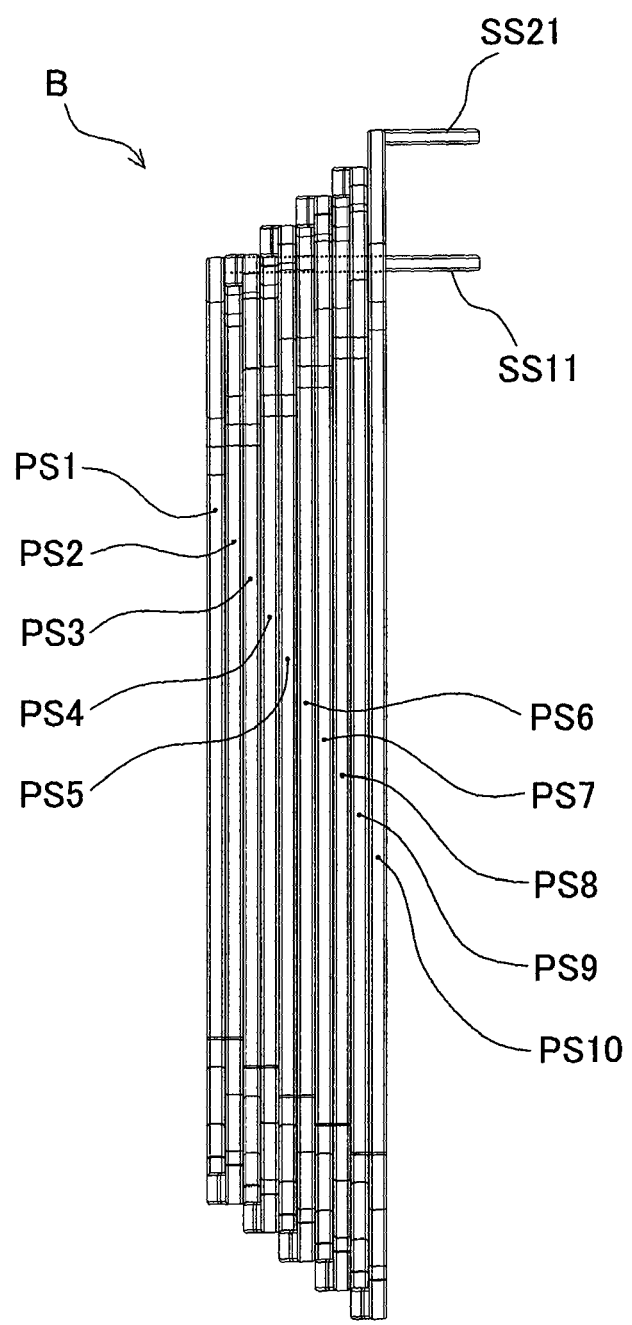
FIG. 6C is a side view of the stepped wave winding conductor wire in the embodiment.

FIG. 6A is a front view of a stepped wave winding conductor wire ("stepped wave winding wire") B. FIG. 6B is a top view of the stepped wave winding wire B, seen from the side of the first and second wire end portions SS1 and SS2 in FIG. 6A. FIG. 6C is a side view of the stepped wave winding wire B, seen from the side of the second conductor end portion SS2 and the straight portion PS10 in FIG. 6A. The stepped wave winding wire B is formed by bending the wave winding wire A at the step-unformed parts KA1 to KA9 respectively to form step parts K1 to K9 as shown in FIGS. 6A to 6C.

Stepped portions formed in the step parts K1 to K9 are each formed so that a step corresponding to the thickness of the flat conductor D is formed, for example, between the straight portion PS1 and the straight portion PS2 as shown in FIG. 6B. Accordingly, respective ends of the straight portions PS1 to PS10 when seen from above are located stepwise as shown in FIG. 6B.

The straight portions PS1 to PS10 are formed by edgewise processing so that the straight portion PS10 is longest as described above. Accordingly, with the stepped portions formed in the step parts K1 to K9, the stepped wave winding wire B appears to be an almost trapezoidal shape when seen from side as shown in FIG. 6C. The width of the stepped wave winding wire B seen from side corresponds to ten times the thickness of the flat conductor D because the stepped wave winding wire B has nine bent sites, i.e., the step parts K1 to K9.

Figure 7C:
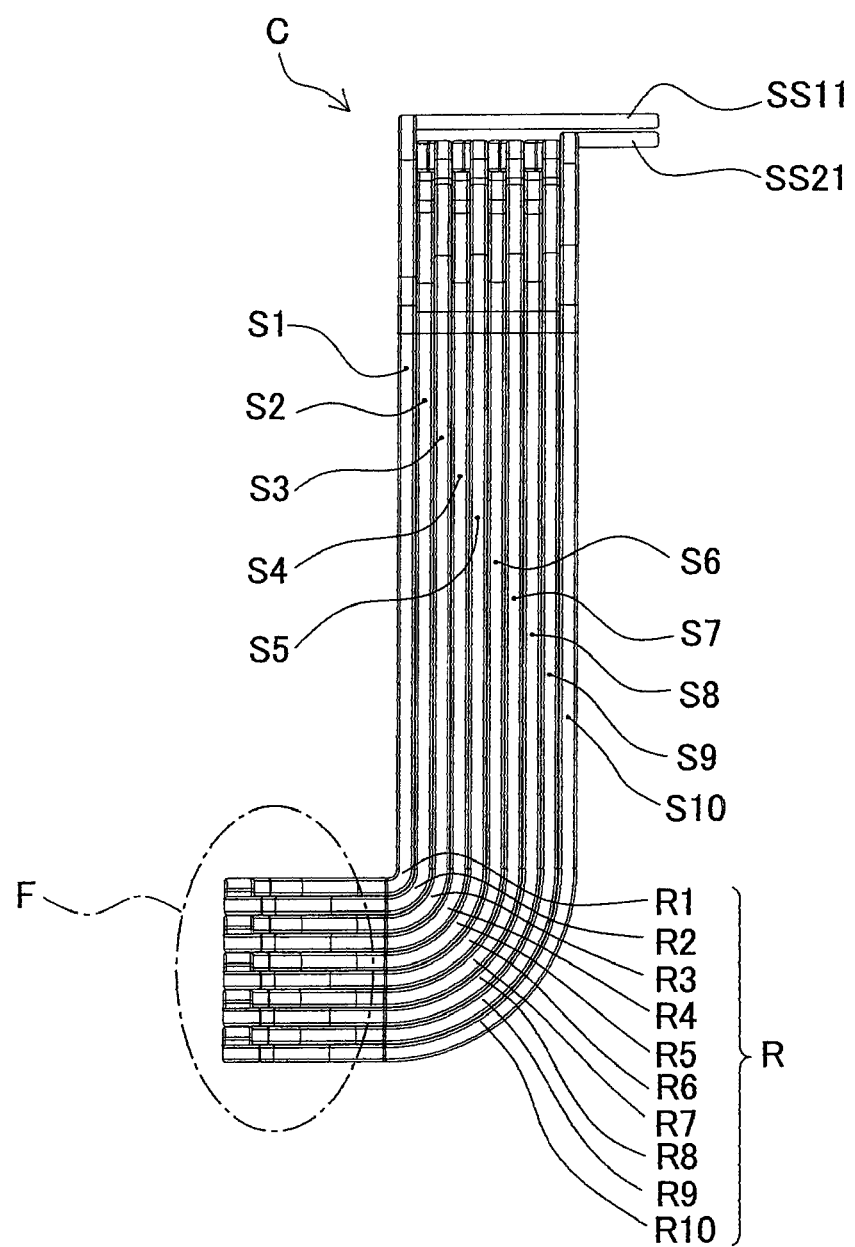
FIG. 7C is a side view of the bent-end wave winding conductor wire in the embodiment.

FIG. 7A is a front view of a bent-end wave winding conductor wire ("bent-end wave winding wire") C. FIG. 7B is a bottom view of the bent-end wave winding wire C, seen from below in FIG. 7A. FIG. 7C is a side view of the bent-end wave winding wire C, seen from side in FIG. 7A.

The stepped wave winding wire B is further subjected to a bending process. As shown in FIGS. 7A to 7C, the non-lead side (on which the first and second wire end portions SS1 and SS2 absent) of the stepped wave winding wire B is subjected to flatwise bending in an opposite direction from the bent end portions SS11 and SS21 by use of a bending jig not shown.

To be specific, the straight portions PS1 and PS2 are flatwise bent so that the connecting portion E1 is orthogonal to a straight line extended from the straight portion PS1, thereby forming an inward protruding portion F1. The portions to be flatwise bent are the straight portions PS1 and PS2. At that time, a first corner portion R1 and a second corner portion R2 are formed on the inner periphery side in the flatwise direction as shown in FIG. 7C. Specifically, the straight portion PS1 is flatwise bent to form an in-slot portion S1 and the first corner portion R1 and the straight portion PS2 is flatwise bent to form an in-slot portion S2 and the second corner portion R2.

As a result, the front part E1M forms an upper part F1M of the connecting portion and the rear part E1N forms a lower part F1N of the connecting portion. Further, the flatwise bending is conducted so that the second corner portion R2 is curved along the outer surface of the flat conductor D forming the first corner portion R1. Even though the corner portions appear to overlap in FIG. 7C, actually, the first corner portion R1 and the second corner portion R2 do not overlap each other as shown in FIGS. 7A and 7B. Further, the in-slot portion S1 and the in-slot portion S2 are equal in length.

Successively, in the connecting portion E3, the straight portions PS3 and PS4 are flatwise bent so that they are orthogonal to a straight line extended from the straight portion PS3, thereby forming an inward protruding portion F3. Flatwise bending the straight portion PS3 forms an in-slot portion S3 and a third corner portion R3, and flatwise bending the straight portion PS4 forms an in-slot portion S4 and a fourth corner portion R4. As a result, a front part E3M forms an upper part F3M of the connecting portion and a rear part E4N forms a lower part F4N of the connecting portion.

Similarly, in the connecting portion E5, an in-slot portion S5, a fifth corner portion R5, an in-slot portion S6, and a sixth corner portion R6 are formed to provide an inward protruding portion F5. In the connecting portion E7, an in-slot portion S7, a seventh corner portion R7, an in-slot portion S8, and an eighth corner portion R8 are formed to provide an inward protruding portion F7. In the connecting portion E9, an in-slot portion S9, a ninth corner portion R9, an in-slot portion S10, and a tenth corner portion R10 are formed to provide an inward protruding portion F9.

Herein, the corner portions R are formed with the bending radii sequentially increasing from the first corner portion R1 to the tenth corner portion R10 as shown in FIG. 7C so that the flat conductors D do not overlap each other. The straight portions PS1 to PS10 are formed to be gradually longer as mentioned above for the reason that the in-slot portions S1 to S10 after the first to tenth corner portions R1 to R10 are formed respectively become equal in length.

Accordingly, the straight portion PS2 is longer than the straight portion PS1 as shown in FIG. 6C and the straight portions PS1 to PS10 are formed to be longer in order, it is designed to absorb differences in length between the corner portions R.

Next, the steps of arranging the bent-end wave winding wires C in a cylindrical shape will be explained.

Figure 8A:
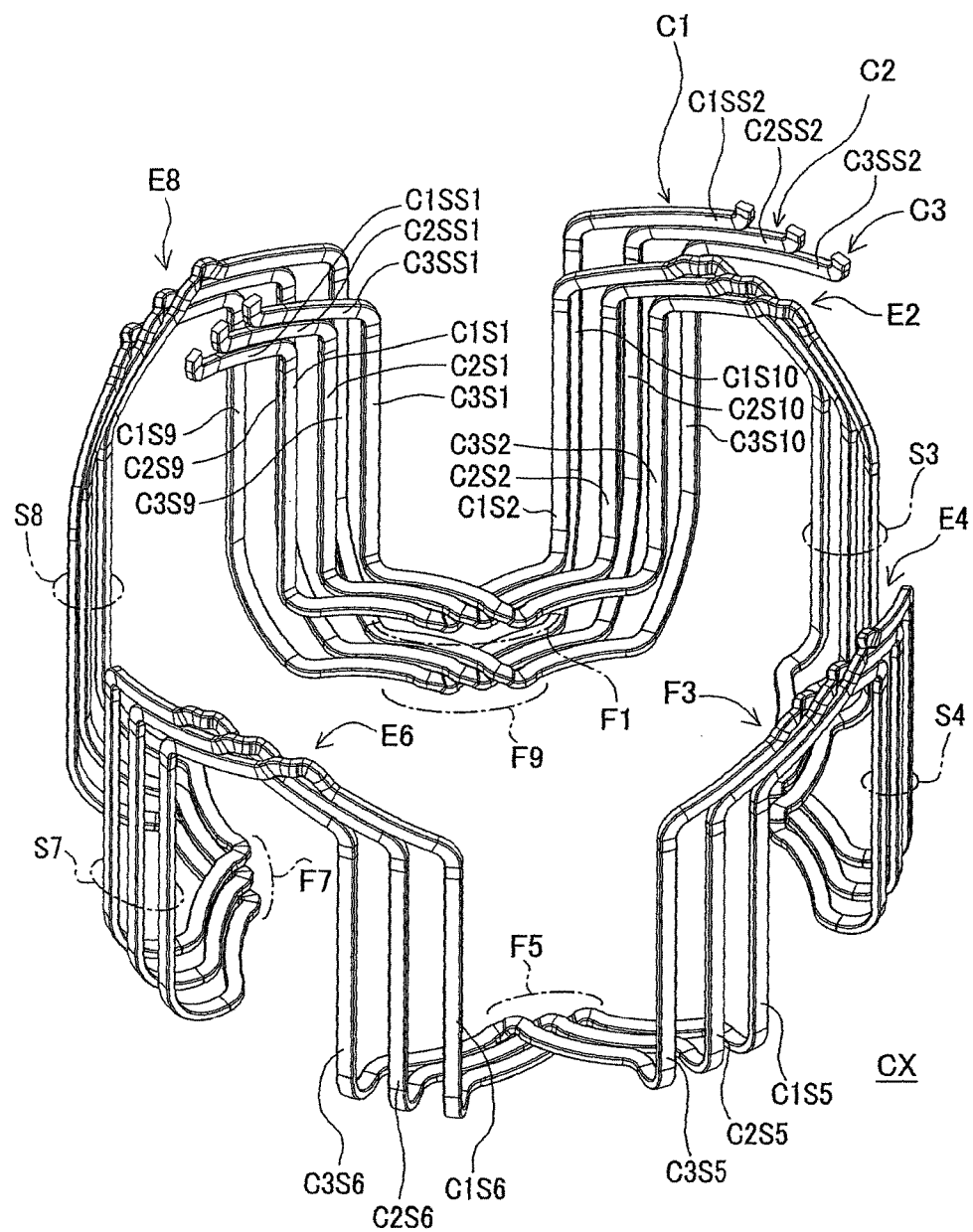
FIG. 8A is a perspective view of a simulated cage coil formed in a cylindrical shape by overlapping three bent-end wave winding conductor wires in the embodiment.
Figure 8B:
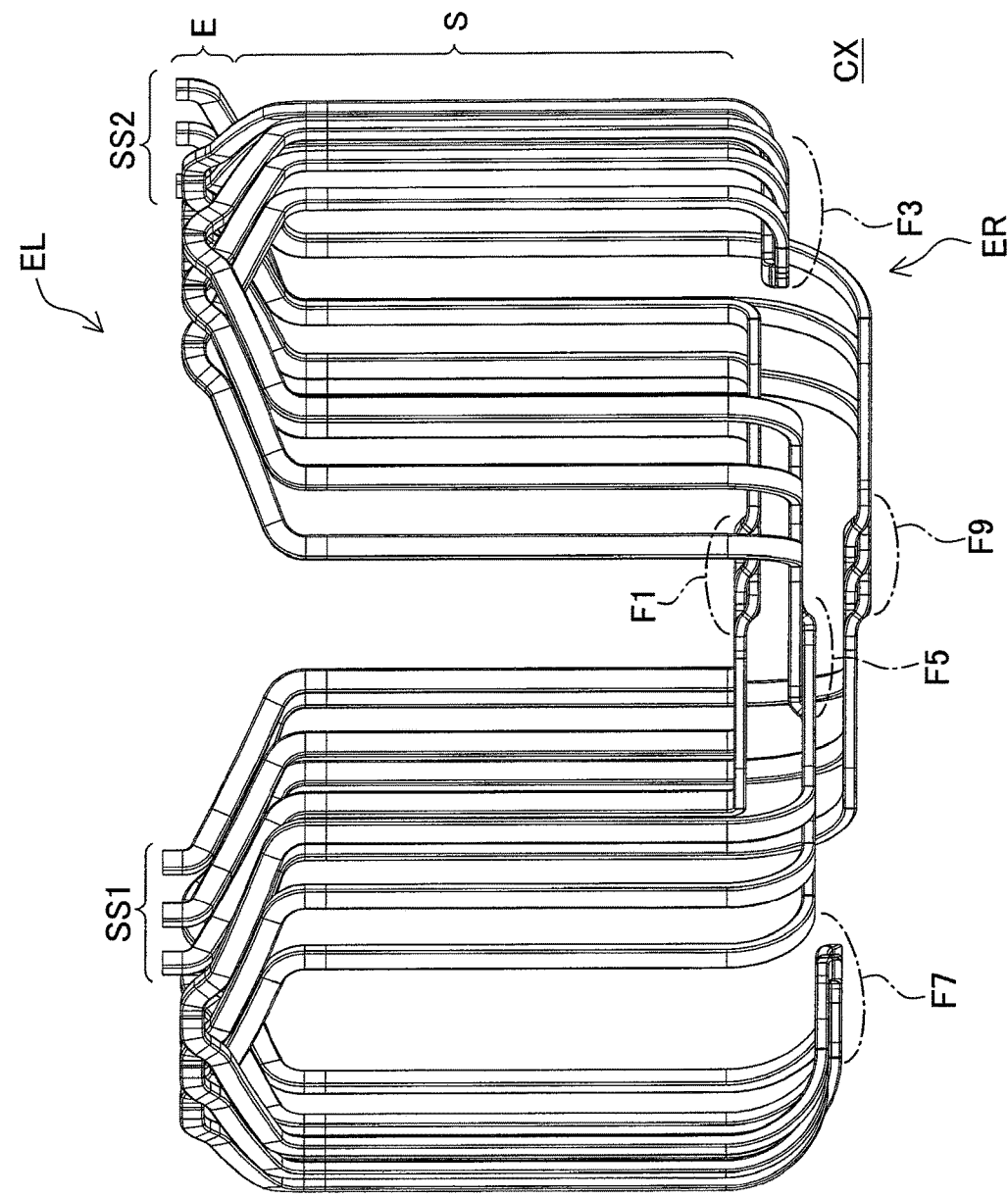
FIG. 8B is a side view of the simulated cage coil formed of the bent-end wave winding conductor wires in the cylindrical shape in the embodiment.
Figure 8C:
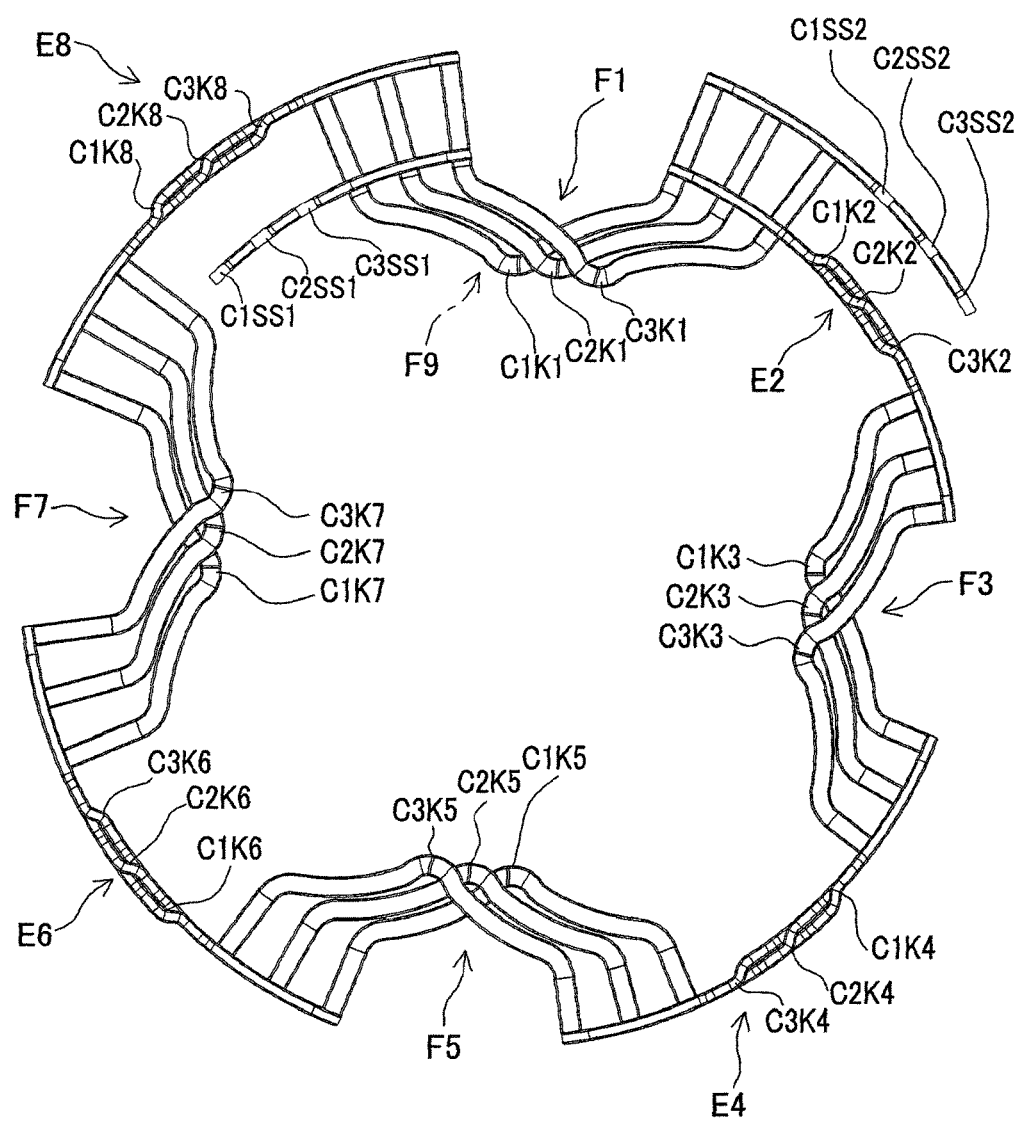
FIG. 8C is a top view of the simulated cage coil formed of the bent-end wave winding conductor wires in the cylindrical shape in the embodiment.
Figure 8D:
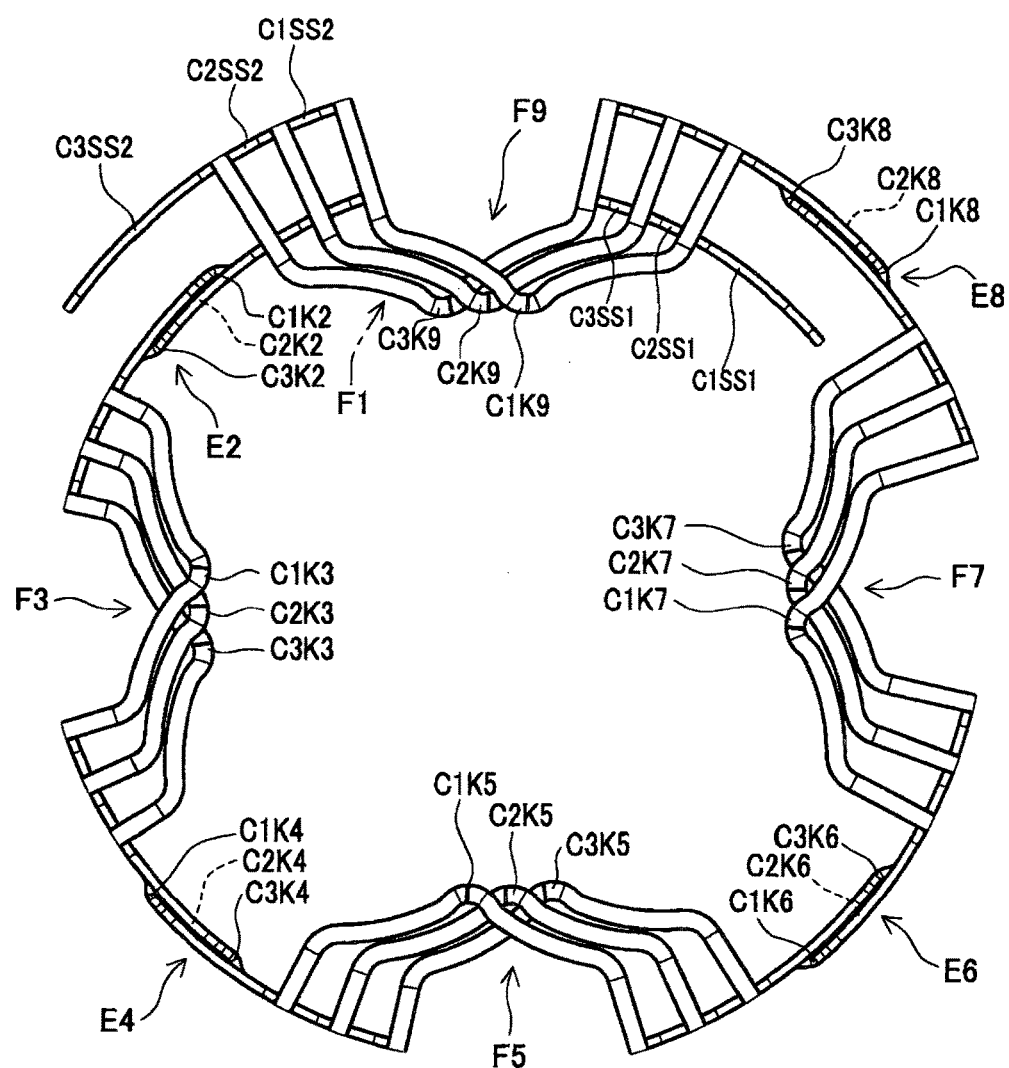
FIG. 8D is a bottom view of the simulated cage coil formed of the bent-end wave winding conductor wires in the cylindrical shape in the embodiment.
Figure 9:
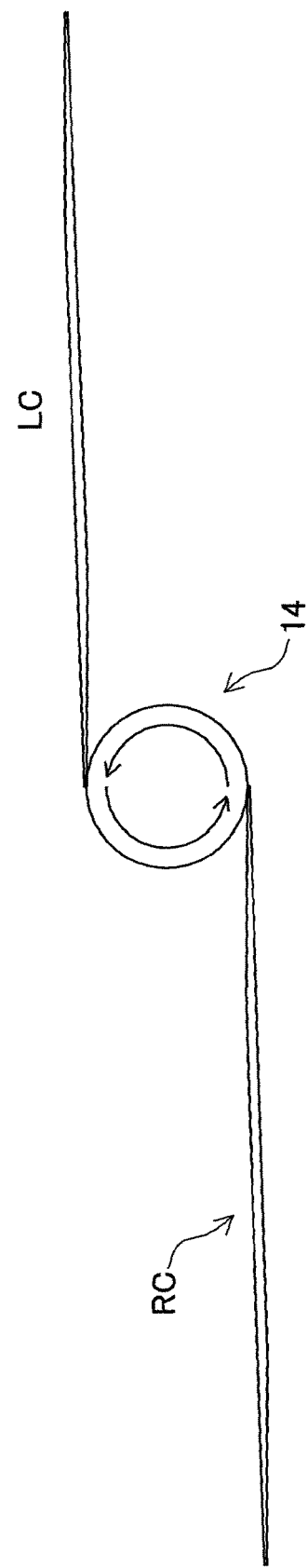
FIG. 9 is a plan view showing a winding concept of the bent-end wave winding conductor wires in the embodiment.

FIG. 8A is a perspective view of a simulated cage coil CX formed of three end-bent wave winding wires C in overlapping relation into a cylindrical shape. FIG. 8B is a side view of the simulated cage coil CX formed of the bend-end wave winding wires C arranged in the cylindrical shape. FIG. 8C is a top view of the simulated cage coil CX formed of the bend-end wave winding wires C arranged in the cylindrical shape. FIG. 8D is a bottom view of the simulated cage coil CX formed of the bend-end wave winding wires C arranged in the cylindrical shape. FIG. 9 is a plan view showing a winding concept of the bent-end wave winding wires C.

For convenience of explanation, the overlapping coils are referred to as a first bent-end wave winding wire C1, a second bent-end wave winding wire C2, and a third bent-end wave winding wire C3. The cage coil 14 of the present embodiment is formed by combining a plurality of the bent-end wave winding wires C shown in FIGS. 7A to 7C in an overlapping arrangement to form a first wave winding wire assembly RC and a second wave winding wire assembly LC, and starting winding of those assemblies from the points displaced by 180° in phase as shown in FIG. 9. In FIGS. 8A to 8D, for visual explanation, only three bent-end wave winding wires C are overlapped and arranged in a cylindrical shape, forming the simulated cage coil CX, to show the positional relation of the flat conductors D forming the first to third bent-end wave winding wires C1 to C3. Note that, FIGS. 8A to 8D show the simulated cage coil in which the bent end portions SS11 and SS21 are omitted for explanation, but the same configuration applies to the case where the bent end portions SS1 and SS21 are provided.

The assembly formed of three bend-end wave winding wires C overlapped in a cylindrical form is referred to as the simulated cage coil CX. This simulated cage coil CX is formed of the first bent-end wave winding wire C1, the second bent-end wave winding wire C2, and the third bent-end wave winding wire C3 that are overlapped in order and rolled into a cylindrical form. At that time, the inward protruding portions F of the first, second, and third bent-end wave winding wires C1, C2, and C3 are placed to face inward of the simulated cage coil CX as shown in FIG. 8A.

On the lead side EL of the simulated cage coil CX, the first conductor end portion SS1 and the second conductor end portion SS2 are placed, and the connecting portions E2, E4, E6, and E8 are located at almost the same height (position). On the other hand, on the non-lead side ER, the inward protruding portions F1, F3, F5, F7, and F9 are placed at different heights (positions). When viewed from the axis direction of the simulated cage coil CX, the inward protruding portions F1 and F9 are placed in positions where they appear to overlap one on the other. Thus, the inward protruding portion F1 in FIG. 8C and the inward protruding portion F9 in FIG. 8D are located in the corresponding positions.

The first conductor end portion SS1 of the first bent-end wave winding wire C1 is placed on the inner periphery side of the connecting portion E8. Specifically, the wire C1 is wound a little more than one turn to form a cylindrical shape so that the second conductor end portion SS2 is placed on the outer periphery side of the connecting portion E2. Thus, an in-slot portion C1S1 and an in-slot portion C1S9 of the first bent-end wave winding wire C1 are respectively disposed in an innermost circumferential position and a second outermost circumferential position in the same slot H1. An in-slot portion C2S1 and an in-slot portion C2S9 of the second bent-end wave winding wire C2 are disposed in similar positions in a slot H1 adjacent to the slot H1 in which the in-slot portions C1S1 and C1S9 of the first wire C1 are set. The same arrangement applies to an in-slot portion C3S1 and an in-slot portion C3S9 of the third bent-end wave winding wire C3.

Further, an in-slot portion C1S2 and an in-slot portion C1S10 of the first bent-end wave winding wire C1 are also placed in the same slot H1 so that the in-slot portion C1S2 is disposed in a second innermost circumferential position in the slot H1 and the in-slot portion C1S10 is disposed in an outermost circumferential position in the slot H1. An in-slot portion C2S2 and an in-slot portion C2S10 of the second bent-end wave winding wire C2 are inserted in the same arrangement in a slot H1 adjacent to the slot H1 in which the in-slot portions C1S2 and C1S10 are disposed. The same arrangement also applies to an in-slot portion C3S2 and an in-slot portion C3S10 of the third bent-end wave winding wire C3.

The simulated cage coil CX is produced in the above procedures. When the cage coil 14 is to be formed, a set of twenty-four bent-end wave winding wires C are assembled to overlap in sequence with a displacement of one slot each, forming the first wave winding wire assembly RC, and another set of twenty-four bent-end wave winding wires C forms in a similar manner the second wave winding wire assembly LC. As shown in FIG. 9, the first assembly RC and the second assembly LC start to be wound with a displacement of 180° in phase to form a cylindrical shape.

Since twenty-four bent-end wave winding wires C are overlapped in sequence to be offset by one slot each, each of the first and second wave winding wire assemblies RC and LC is thin at both ends and thick at the center as shown in FIG. 9. Further, the thickness of each of the first and second wave winding wire assemblies RC and LC is equal to the total thickness of ten flat conductors D, as with the number of flat conductors D disposed in each slot H1. Although it is not clearly illustrated, a winding start end is placed on the inside of the cage coil 14 and a winding terminal end is placed on the outside of the cage coil 14. Thus, the first and second wave winding wire assemblies RC and LC have an almost rhomboid shape when seen from above the cage coil 14. In FIG. 9, the bent end portions SS11 and SS21 and the inward protruding portions F are omitted.

Figure 10A:
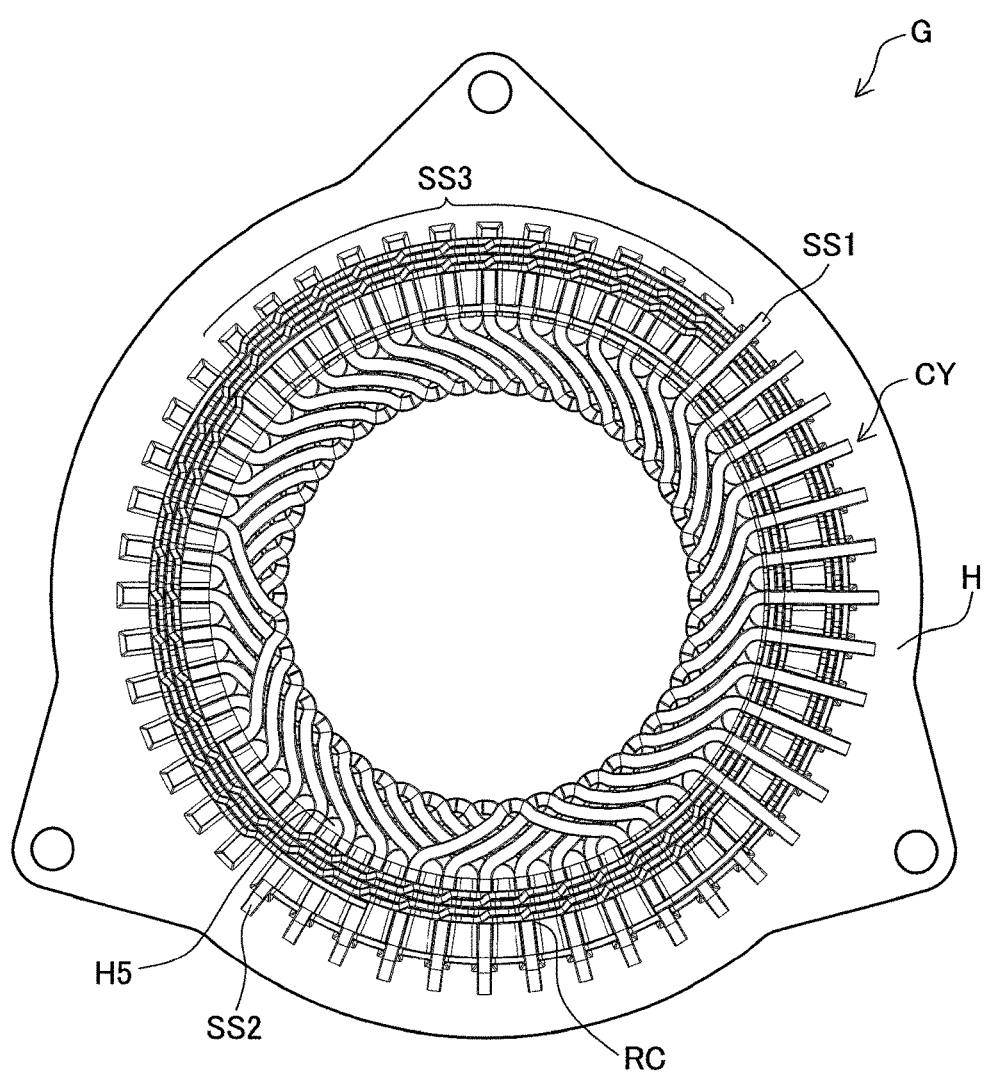
FIG. 10A is a plan view showing a state where half of the cage coil is inserted in the stator core in the embodiment.
Figure 10B:
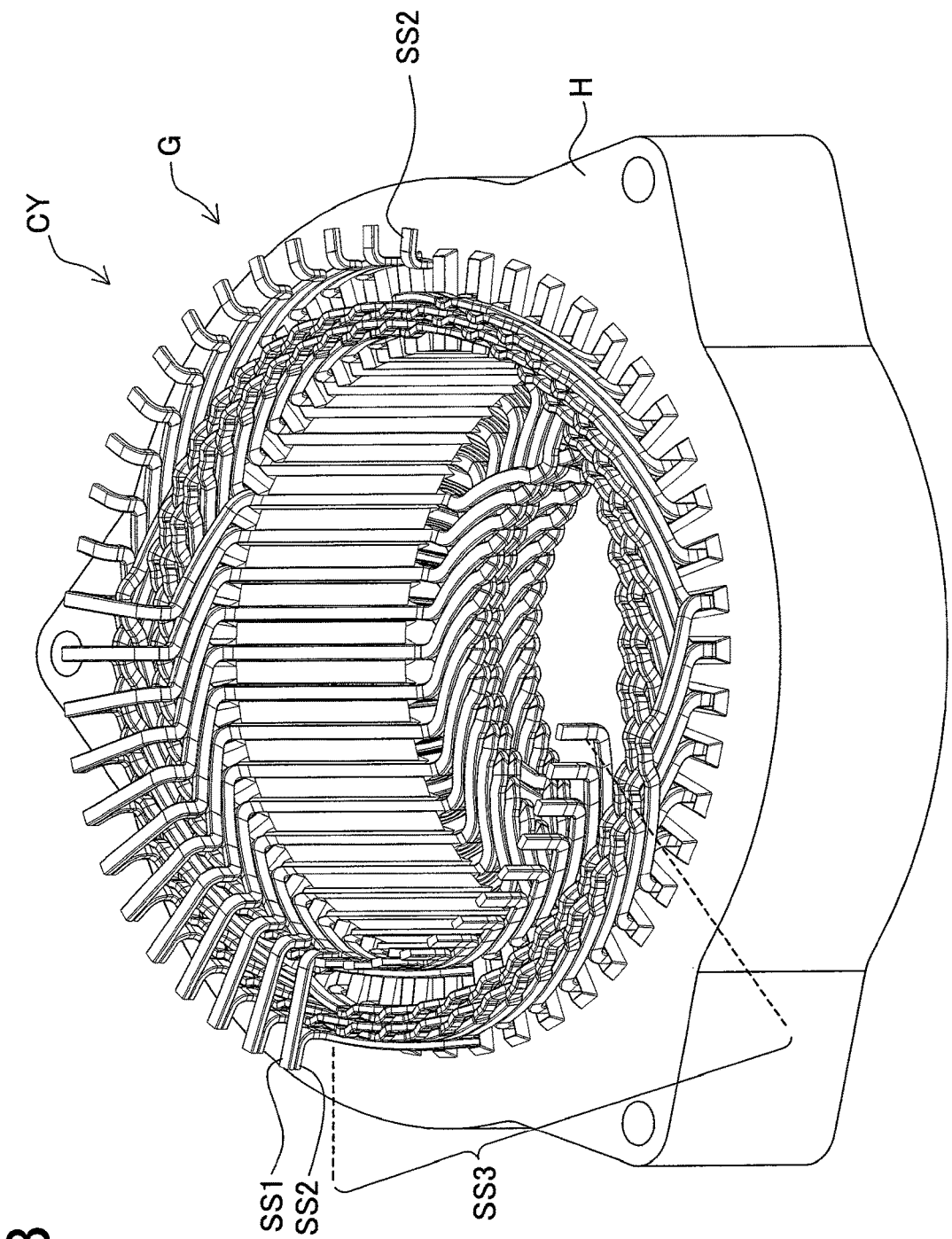
FIG. 10B is a perspective view showing the state where half of the cage coil is inserted in the stator core in the embodiment, seen from a lead side.
Figure 10C:
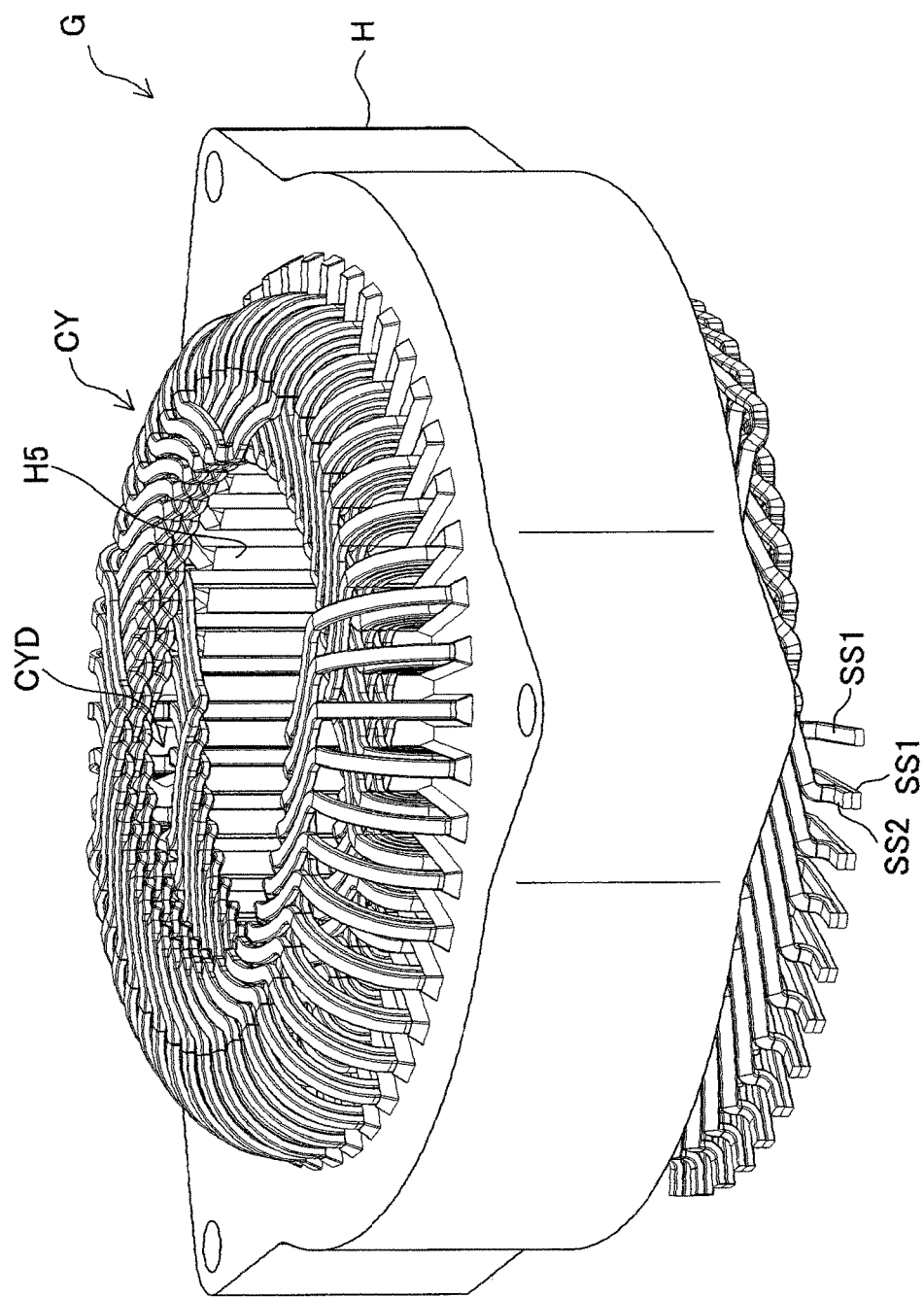
FIG. 10C is a perspective view showing the state where half of the cage coil is inserted in the stator core in the embodiment, seen from a non-lead side.

FIG. 10A is a plan view showing a state where half of the cage coil 14 is inserted in the stator core H. FIG. 10B is a perspective view showing the state where half of the cage coil 14 is inserted in the stator core H, seen from the lead side. FIG. 10C is a perspective view showing the state where half of the cage coil 14 is inserted in the stator core H, seen from the non-lead side. FIGS. 10A to 10C show that, for explanation, only half of the cage coil 14, that is, a cylindrical coil formed of either the first wave winding wire assembly RC or the second wave winding wire assembly LC is inserted in the stator core H. For convenience, this cylindrical coil formed of only half of the cage coil 14 is hereinafter referred to as a half cage coil CY.

The half cage coil CY is formed of the first wave winding wire assembly RC in a spiral shape as shown in FIG. 10A. The second wave winding wire assembly LC is not illustrated but it is wound in a spiral shape between portions of the first wave winding wire assembly RC with hatching in FIG. 10A.

The first conductor end portion SS1 is placed to protrude outward of the stator G and the second conductor end portion SS2 is placed to overlap the first conductor end portion SS1. This condition is illustrated in FIG. 10A. Note that there is a section in which the first and second wire end portions SS1 and SS2 are not provided and the in-slot portions S1 and S2 protrude in the axis direction of the stator G. This section is denoted as the terminal binding section SS3, in which the in-slot portions in a completed stator G as shown in FIG. 1 are connected, via bus bars not shown, to terminals coupled to components outside of the stator G or connected by bus bars to form neutral points.

The non-lead side ER of the half cage coil CY is as shown in FIG. 10. When the cage coil 14 is completed, the first and second wave winding wire assemblies RC and LC also alternately overlap on the non-lead side ER. Therefore, on the non-lead side ER of the half cage coil CY formed of only the first wave winding wire assembly RC, a clearance CYD in which the second wave winding wire assembly LC will be placed is formed spirally.

Further, also in the half cage coil CY, the connecting portions E1, E3, E5, E7, and E9 are similarly bent inward, so that these connecting portions E protrude more inward than the inner peripheral surfaces H5 of the stator core H.

The first and second wire end portions SS1 and SS2 are overlapped and joined by welding on the lead side EL. However, in FIG. 10B, there is a section where the second wire end portions SS2 are placed alone without overlapping the first wire end portions SS1. In FIG. 10C, there is a section where the first wire end portions SS1 are placed alone without overlapping the second wire end portions SS2. The end portions in this section will be overlapped and joined with the first wire end portions SS1 and the second wire end portions SS2 of the second wave winding wire assembly LC not shown. Accordingly, the first wave winding wire assembly RC and the second wave winding wire assembly LC are electrically connected to each other.

As above, the stator G is explained by using the simulated cage coil CX and the half cage coil CY. Actually, the first and second wave winding wire assemblies RC and LC are arranged in the positions shown in FIG. 9 with different phases by 180° and simultaneously wound in plural turns into a spiral shape, forming the cylindrical cage coil 14 consisting of the first and second wave winding wire assemblies RC and LC. In this way, the cage coil 14 shown in FIGS. 4A to 4C is produced. Although it is not particularly mentioned, a cylindrical holding jig is put at the midpoint between the assemblies RC and LC to wind the first and second wave winding wire assemblies RC and LC. This holding jig holds respective one leading ends of the first and second wave winding wire assemblies RC and LC and then is rotated to form the cage coil 14. It is to be noted that two wave winding wire assemblies, i.e., the first and second assemblies RC and LC, are prepared for forming the cage coil 14 in the present embodiment, but three or more wave winding wire assemblies also may be used.

Figure 11B:
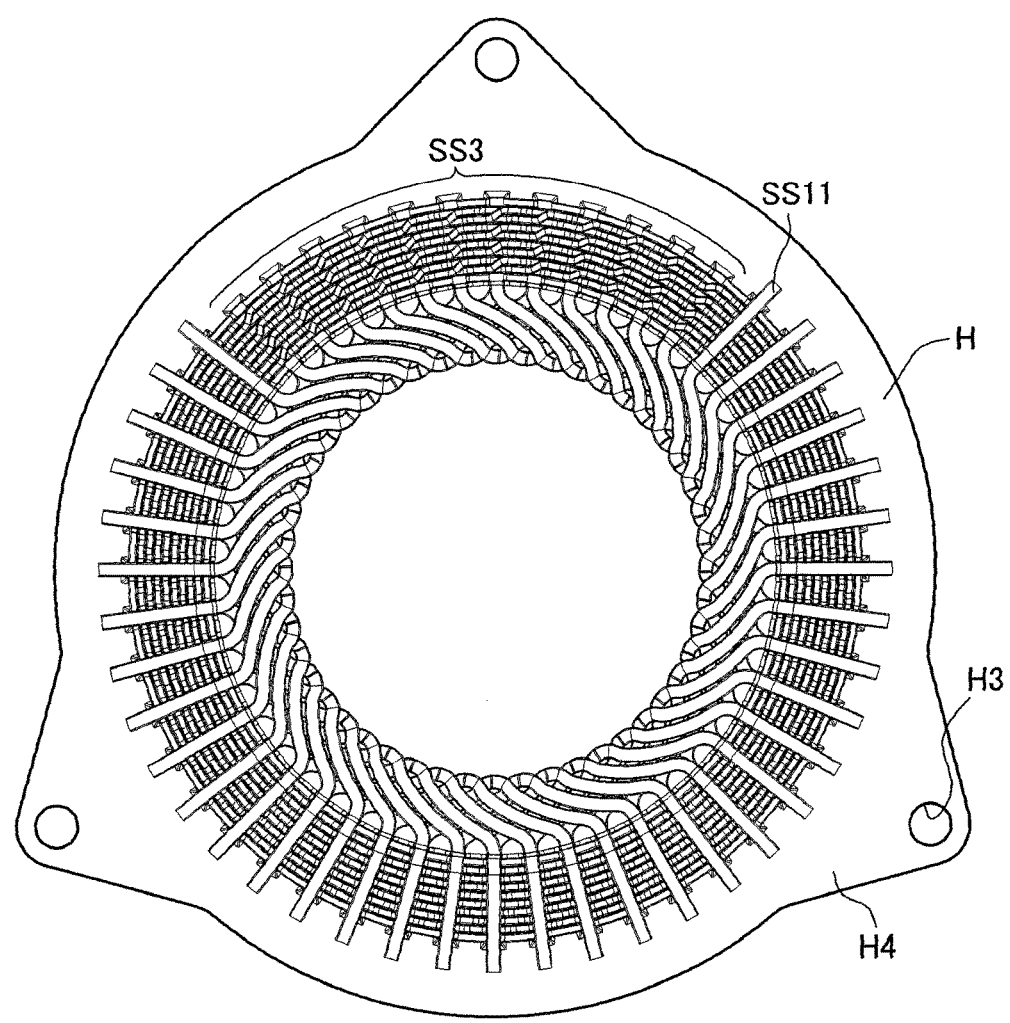
FIG. 11B is a top view of the stator in the embodiment.
Figure 11C:
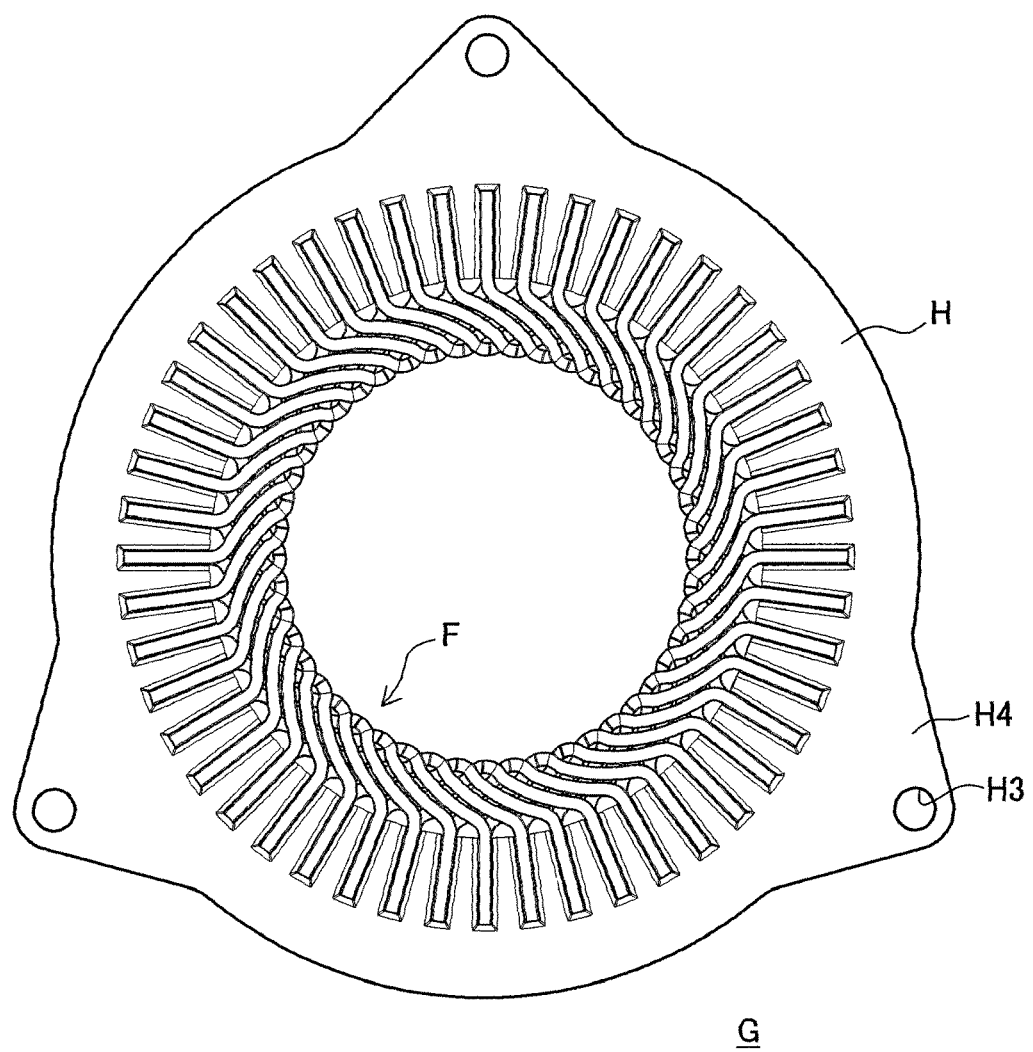
FIG. 11C is a bottom view of the stator in the embodiment.

The thus formed cage coil 14, which is in a state shown in FIGS. 4A to 4C, is inserted in the stator core H shown in FIG. 3, thus producing the stator G shown in FIG. 1. FIG. 11B is a top view of the stator G, seen from the side of the lead side EL of FIG. 11A. FIG. 11C is a bottom view of the stator G, seen from the side of the non-lead side ER of FIG. 11A.

The stator G has the shape shown in FIGS. 11A to 11C. Note that FIG. 1 explained above is a perspective view of the stator G shown in FIGS. 11A to 11C. The cage coil 14 is inserted in the stator core H from the non-lead side ER, thus producing the stator G. In each slot H1 of the stator core H, ten flat conductors D are placed. The stator G in the present embodiment has three phases, i.e., a U phase, a V phase, and a W phase. The coil terminals TC are welded to the terminal binding section SS3 to form a connecting terminal part for electrical connection with the external power source or the like.

Figure 12:
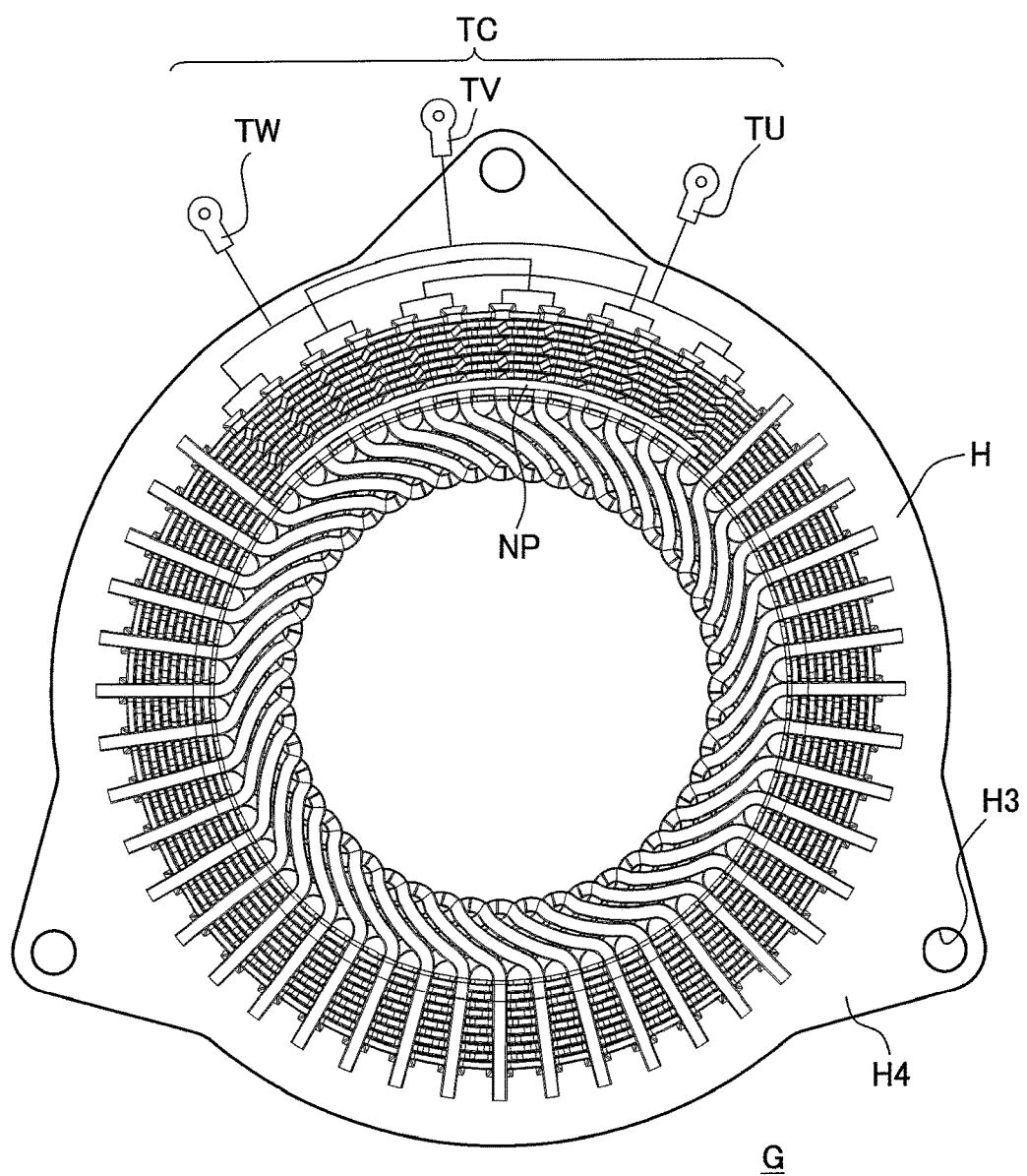
FIG. 12 is a conceptual diagram showing that terminal portions are connected to the stator in the embodiment.

FIG. 12 is a conceptual view when the coil terminals TC are to be connected to the stator G. For joining the bent end portions SS11 to the bent end portions SS21 and welding the first and second wire end portions SS1 and SS2 of the terminal binding section SS3 to the bus bars may be conducted by welding after the cage coil 14 is formed or performed by welding after the cage coil 14 is assembled with the stator core H.

The first wire end portions SS1 placed on the inner circumferential side of the stator G are connected to the bas bars by welding or the like to form the neutral points NP. The second wire end portions SS2 placed on the outer circumferential side of the stator G are connected per phase to form the U-phase terminal TU, the V-phase terminal TV, and the W-phase terminal TW. In the case of the U phase shown in FIG. 12, four second wire end portions SS2 for U phase are bound and connected to the U-phase terminal TU. The same applies to the V-phase terminal and the U-phase terminal TU. In this manner, the coil terminals TC are formed.

Thereafter, welded portions between the bent end portions SS11 and the bent end portions SS21, between the first wire end portions SS1 and the bus bars used for forming the neutral points NP, and between the second wire end portions SS2 and the bus bars forming the U-phase terminal TU, V-phase terminal TV, and W-phase terminal TW are subjected to insulation protection using a resin material with high insulating properties.

Figure 13:
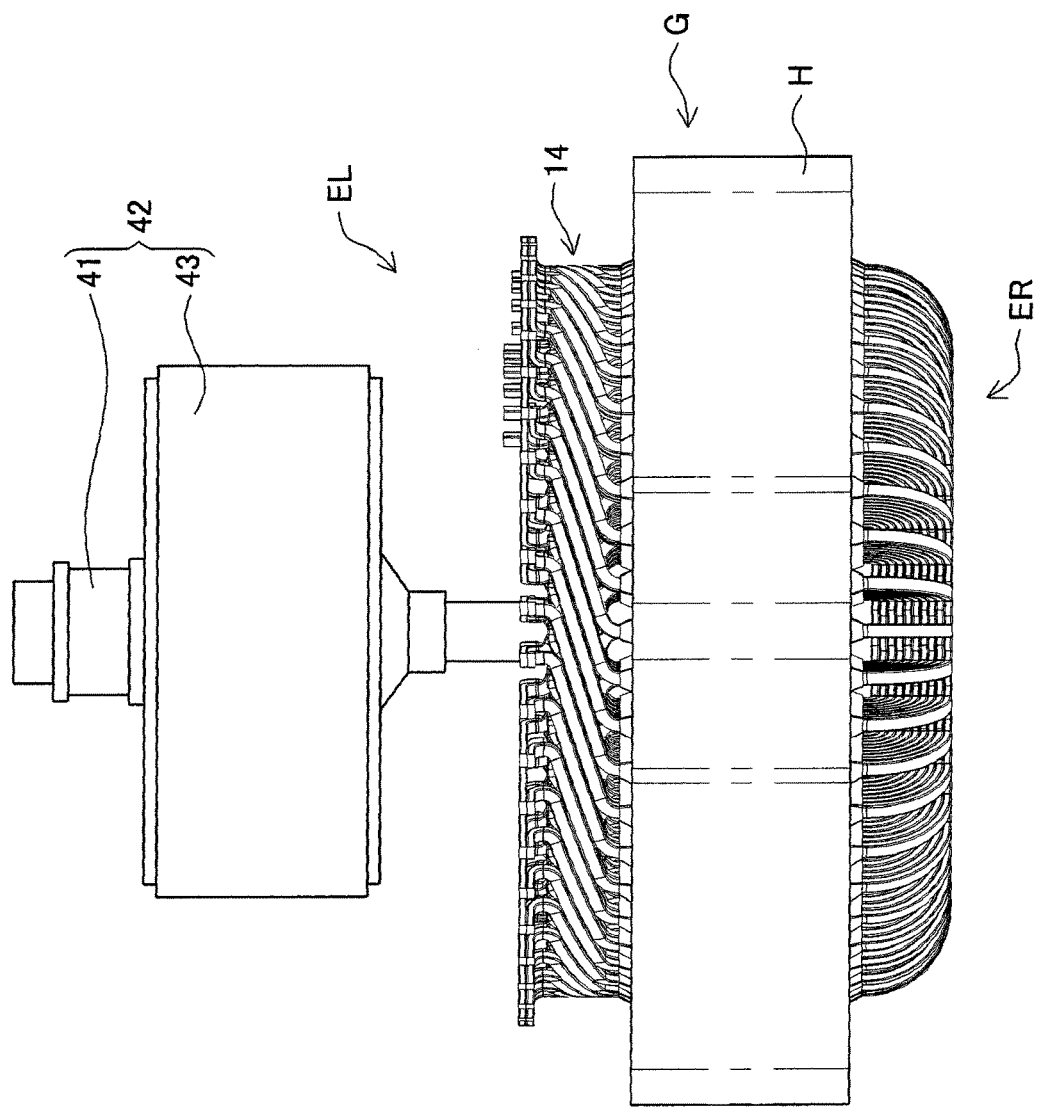
FIG. 13 is a side view showing a state where a rotor is inserted in the stator in the embodiment.

FIG. 13 is a side view showing a condition where the rotor 42 is to be inserted in the stator G. As mentioned above, the stator G includes the inward protruding portions F located more inward than the inner peripheral surfaces 115 of the stator core H. Therefore, when the rotor 42 is to be inserted in the stator G, this insertion is performed from the lead side EL as shown in FIG. 13.

The rotor 42 includes the rotor shaft 41 and the rotor core 43 and is inserted in the stator G so that the rotor core 43 is located more inward than the inner peripheral surfaces H5 of the stator core H, and is held with a bearing provided in a motor cover not shown. By assembling the rotor 42 and the stator G, the motor M is completed.

The motor M in the present embodiment is configured as above and provides the operations and effects explained blow.

Firstly, high assembling easiness can be provided. In the motor M in the present embodiment including the stator G provided with the wave winding coil using the flat conductors D and the stator core H and the rotor 42 provided with the center shaft, the wave winding coil includes the cage coil 14 formed of the first and second wave winding wire assemblies RC and LC that are wound in plural turns, each of the assemblies being formed of a plurality of bent-end wave winding wires C each formed in a continuous meandering pattern and overlapped in sequence with displacements. The coil end part at one end of the cage coil 14 is bent toward the rotor 42 with respect to the in-slot portions S in the stator core H. The coil end part at the one end is positioned closer to the axis of the rotor 42 than the inner peripheral surface of the stator core H is.

The bent-end wave winding wires C are stacked to form the first and second wave winding wire assemblies RC and LC respectively. These assemblies are wound in plural turns into a cylindrical shape, thereby producing the cage coil 14. The non-lead side ER of this cage coil 14 includes the inward protruding portions F formed by bending the stepped wave winding wires B inward.

The cage coil 14 will be inserted in the stator core H so as to bring the non-lead side ER close to the stator core H. Since the coil end of the cage coil 14 has been bent to form the inward protruding portions F, no interference portion exists in a part to be inserted from the non-lead side ER in the slots H1 of the stator core H. Accordingly, the cage coil 14 can be installed in the stator core H without being applied with excessive force.

Consequently, it is possible to reduce the risk of protruding the flat conductors D out of the slots H1 of the stator core H due to spring back generated when the coil is elastically deformed as described in the above PROBLEM.

Further, the cage coil 14 includes the inward protruding portions F and is configured to be easy to assemble with the stator core H. Accordingly, it is not necessary to adopt a split type stator core as the stator core H. Although there is no other choice but to use a split type core for the wave winding coil because of its structure, the split type stator core has the problem with large iron loss as compared with the integral type stator core H. However, by adopting the structure such as the cage coil 14, the integral type stator core H can be used in the motor M. Thus, the iron loss of the motor M can be reduced, contributing to enhancement of performance.

The cage coil 14 includes the first wave winding wire assembly RC and the second wave winding wire assembly LC. These first and second assemblies RC and LC are simultaneously wound in plural turns from the positions different by 180° from each other on the circumference of the cage coil 14. Accordingly, when the bent-end wave winding wires C formed with the inward protruding portions F are wound in plural turns, the cage coil 14 can be easily formed.

In the case where forty-eight bent-end wave winding wires C are to be overlapped in a cylindrical shape, for example, it is necessary to deform the straight portions PS1 and PS2 of each bent-end wave winding wire C relative to the vicinity of the step part K1. Thus, the end portions need to be slightly deformed when they are overlapped. However, since the winding conductor assembly is divided into two, the first wave winding wire assembly RC and the second wave winding wire assembly LC, and they are wound with a displacement of 180° in phase, a deformation amount can be reduced and high assembling easiness can be provided. Instead of dividing the winding conductor assembly into two; the first and second wave winding wire assemblies RC and LC, it may be divided into three or more with the same effects.

Further, since the bent end portions SS11 and SS21 are placed on the outer circumference of the cage coil 14 in the stator G, the stator G can have a small axial dimension. Because the bent end portions SS11 and SS21 are arranged on the outer circumference of the cage coil 14 without extending in the axis direction of the stator G and joining to each other, the protruding length of the cage coil 14 on the lead side EL can be made small, achieving a compact coil end. The bent end portions SS11 and SS21 located on the outer circumference side of the cage coil 14 are more inside than the outer periphery of the stator core H as shown in FIG. 11B and other figures. Accordingly, they do not extend beyond the stator G in the radial direction.

The wave winding wire is configured such that the last one of the coil end parts at one end overlaps the first one in the radial direction. Specifically, the straight portion PS1 and the straight portion PS2 of the wave winding wire A shown in FIG. 5A overlap respectively the straight portion PS9 and the straight portion PS10 in the radial direction. Thus, the adjacent positions of the terminals for U phase, V phase, and W phase of the bent-end wave winding wires C can be placed close to each other.

Considering the cage coil 14, if the bent-end wave winding wires C are inserted in the stator core H while the inward protruding portions F1 and F9 overlap in the axis direction on the non-lead side ER, the in-slot portions S1 and S9 are inserted in the same slots H1 and the in-slot portions S2 and S10 are inserted in another same slot H1. Therefore, they are placed together at one place denoted by the terminal binding section SS3 to simplify the structures of the U-phase terminal TU, the V-phase terminal TV, the W-phase terminal TW, and the neutral points NP. The coil end parts of the stator G can also be shortened in the axis direction.

Further, in the coil end part of the cage coil 14 on the non-lead side ER, the second bent-end wave winding wires C2 are overlapped on the first bent-end wave winding wires C1 in the direction close to the stator core H. The volume of the coil end part can therefore be made compact.

The wave winding wire A is processed into the stepped wave winding wire B so that the step-unformed parts KA1 to KA9 become the step parts K1 to K9. Accordingly, when the stepped wave winding wire B is further processed into the bent-end wave winding wire C, bridging portions of the inward protruding portions F can be formed. These bridging portions are combined with such a situation that the second bent-end wave winding wire C2 bridges over the first bent-end wave winding wire C1 as shown in FIG. 8A. Accordingly, the second bent-end wave winding wire C2 is overlapped under the first bent-end wave winding wire C1 in a position closer to the stator core H. As a result, the flat conductors D can be overlapped finely one on another. This makes it possible to reduce the volume of the coil end parts of the stator core H.

The present invention is explained above along the embodiment but is not limited thereto. The present invention may be embodied in other specific forms without departing from the essential characteristics thereof.

For instance, the stator G in the present embodiment is the stator core H with forty-eight slots but it may be modified according to the design requirements. Similarly, the number of bending the wave winding wire A in a meandering pattern, the number of flat conductors D inserted in each slot H1 may be changed.

DESCRIPTION OF THE REFERENCE SIGNS

14 Cage coil
42 Rotor
A Wave winding conductor wire
B Stepped wave winding conductor wire
C Bend-end wave winding conductor wire
D Flat conductor
E Connecting portion
F Inward protruding portion
G Stator
H Stator core
M Motor
S In-slot portion

The invention claimed is:

1. A motor including a stator provided with a wave winding coil using a flat conductor wire and a rotor provided with a center shaft,
wherein the wave winding coil includes a cage coil formed of a wave winding wire assembly wound in plural turns, the assembly consisting of a plurality of wave winding conductor wires each being formed in a continuous meandering pattern so that straight portions are longer in sequence and a coil end part at one end is bent toward the rotor with respect to in-slot portions of a stator core, and the wave winding conductor wires being overlapped in sequence with displacements,
the wave winding conductor wires are formed with bending radii that increases sequentially,
step portions are formed at the coil end part of the wave winding conductor wires in the wave winding coil so that each step portion corresponds to a thickness of the flat conductor wire and the in-slot portions are displaced in sequence in a radial direction in different slots, and
the coil end part at the one end is located closer to an axis of the rotor than an inner peripheral surface of the stator core is.

2. The motor according to claim 1, wherein a turned portion is formed at one end of each of the wave winding conductor wires and a turned portion formed at the other end are overlapped in the axis direction of the stator core in the coil end part of the cage coil at the one end.

3. The motor according to claim 1, wherein the cage coil is formed in such a manner that leading ends of the wave winding conductor assemblies are simultaneously wound in a spiral shape.

* * * * *